United States Patent
Liu

(10) Patent No.: US 10,466,869 B2
(45) Date of Patent: Nov. 5, 2019

(54) EXTRACTING AND VISUALIZING BRANCHING PATTERNS FROM TEMPORAL EVENT SEQUENCES

(71) Applicant: Adobe Inc., San Jose, CA (US)

(72) Inventor: Zhicheng Liu, Sunnyvale, CA (US)

(73) Assignee: Adobe Inc., San Jose, CA (US)

( * ) Notice: Subject to any disclaimer, the term of this patent is extended or adjusted under 35 U.S.C. 154(b) by 244 days.

(21) Appl. No.: 15/583,275

(22) Filed: May 1, 2017

(65) Prior Publication Data
US 2018/0314700 A1 Nov. 1, 2018

(51) Int. Cl.
*G06F 3/0482* (2013.01)
*G06T 11/20* (2006.01)
*G06T 11/60* (2006.01)
*G06F 16/26* (2019.01)

(52) U.S. Cl.
CPC ............ *G06F 3/0482* (2013.01); *G06F 16/26* (2019.01); *G06T 11/206* (2013.01); *G06T 11/60* (2013.01); *G06T 2200/24* (2013.01)

(58) Field of Classification Search
CPC ...... G06F 3/0482; G06F 16/26; G06T 11/206; G06T 11/60; G06T 2200/24
See application file for complete search history.

(56) References Cited

U.S. PATENT DOCUMENTS 9,021,361 B1* 4/2015 Pettinati .................. G06F 3/048
715/736
2015/0160831 A1* 6/2015 Nor .......................... G06F 11/30
715/748

OTHER PUBLICATIONS

E Bahar. 2003. CloSpan: Mining: Closed sequential patterns in large datasets. (2003).
M. Bostock, V. Ogievetsky, and J. Heer. 2011. D3 data-driven documents. Visualization and Computer Graphics, IEEE Transactions on 17, 12 (2011), 2301-2309.
Christoph Buchheim, Michael Jünger, and Sebastian Leipert. 2002. Improving Walker's algorithm to run in linear time. In International Symposium on Graph Drawing. Springer, 344-353.
Philippe Fournier-Viger, Antonio Gomariz, Ted Gueniche, Azadeh Soltani, Cheng-Wei Wu, and Vincent S Tseng. 2014a. SPMF: a java open-source pattern mining library. The Journal of Machine Learning Research 15, 1 (2014), 3389-3393.
Philippe Fournier-Viger, Cheng-Wei Wu, Antonio Gomariz, and Vincent S Tseng. 2014b. VMSP: Efficient vertical mining of maximal sequential patterns. In Advances in Artificial Intelligence. Springer, 83-94.
David Gotz and Harry Stavropoulos. 2014. Decisionflow: Visual analytics for high-dimensional temporal event sequence data. IEEE transactions on visualization and computer graphics 20, 12 (2014), 1783-1792.

(Continued)

*Primary Examiner* — Roland J Casillas
(74) *Attorney, Agent, or Firm* — Keller Jolley Preece

(57) ABSTRACT

The present disclosure is directed toward systems and methods for extracting a branching pattern from a dataset of event sequences. For example, one or more embodiments described herein extract a branching pattern from a dataset that illustrates patterns of events within the dataset. Additionally, one or more embodiments described herein generate one or more interactive visualizations based on the extracted branching pattern that enable an analyst to query specific portions of the extracted branching pattern.

20 Claims, 12 Drawing Sheets

(56) References Cited

OTHER PUBLICATIONS

Daniel A Keim, Jörn Schneidewind, and Mike Sips. 2005. Fp-viz: Visual frequent pattern mining. (2005).
Joseph B Kruskal and James M Landwehr. 1983. Icicle plots: Better displays for hierarchical clustering. The American Statistician 37, 2 (1983), 162-168.
Bum Chul Kwon, Janu Verma, and Adam Perer. 2016. Peekquence: Visual Analytics for Event Sequence Data. In ACM SIGKDD 2016 Workshop on Interactive Data Exploration and Analytics.
Heidi Lam, Daniel Russell, Diane Tang, and Tamara Munzner. 2007. Session Viewer: Visual Exploratory Analysis of Web Session Logs. In Visual Analytics Science and Technology, 2007. VAST 2007. IEEE Symposium on. 147-154.
Zhicheng Liu, Yang Wang, Mira Dontcheva, Matt Hoffman, Seth Walker, and Alan Wilson. 2017. Patterns and Sequences: Interactive Exploration of Clickstreams to Understand Common Visitor Paths. IEEE Transactions on Visualization and Computer Graphics 23, 01 (Jan. 2017).
Sana Malik, Ben Shneiderman, Fan Du, Catherine Plaisant, and Margret Bjarnadottir. 2016. High-Volume Hypothesis Testing: Systematic Exploration of Event Sequence Comparisons. ACM Transactions on Interactive Intelligent Systems 6, 1, Article 9 (Mar. 2016), 23 pages.
Megan Monroe, Rongjian Lan, Hanseung Lee, Catherine Plaisant, and Ben Shneiderman. 2013. Temporal event sequence simplification. Visualization and Computer Graphics, IEEE Transactions on 19,12 (2013), 2227-2236.
Adam Perer and Fei Wang. 2014. Frequence: interactive mining and visualization of temporal frequent event sequences. In Proceedings of the 19th international conference on Intelligent User Interfaces. ACM, 153-162.
John Stasko and Eugene Zhang. 2000. Focus+ context display and navigation techniques for enhancing radial, space-filling hierarchy visualizations. In Information Visualization, 2000. InfoVis 2000. IEEE Symposium on. IEEE, 57-65.
Gang Wang, Xinyi Zhang, Shiliang Tang, Haitao Zheng, and Ben Y Zhao. 2016. Unsupervised Clickstream Clustering for User Behavior Analysis. In SIGCHI Conference on Human Factors in Computing Systems.
Jishang Wei, Zegian Shen, Neel Sundaresan, and Kwan-Liu Ma. 2012. Visual cluster exploration of web clickstream data. In Visual Analytics Science and Technology (VAST), 2012 IEEE Conference on. IEEE, 3-12.
Krist Wongsuphasawat, John Alexis Guerra Gómez, Catherine Plaisant, Taowei David Wang, Meirav Taieb-Maimon, and Ben Shneiderman. 2011. LifeFlow: visualizing an overview of event sequences. In Proceedings of the SIGCHI conference on human factors in computing systems. ACM, 1747-1756.
Emanuel Zgraggen, Steven M Drucker, and Danyel Fisher. 2015. (s | qu)eries: Visual Regular Expressions for Querying and Exploring Event Sequences. Proceedings of CHI 2015 (2015).
Xiang Zhang, Hans-Frederick Brown, and Anil Shankar. 2016. Data-driven Personas: Constructing Archetypal Users with Clickstreams and User Telemetry. In Proceedings of the 2016 CHI Conference on Human Factors in Computing Systems. ACM, 5350-5359.
Jian Zhao, Zhicheng Liu, Mira Dontcheva, Aaron Hertzmann, and Alan Wilson. 2015. MatrixWave: Visual comparison of event sequence data. In Proceedings of the 33rd Annual ACM Conference on Human Factors in Computing Systems. ACM, 259-268.

* cited by examiner

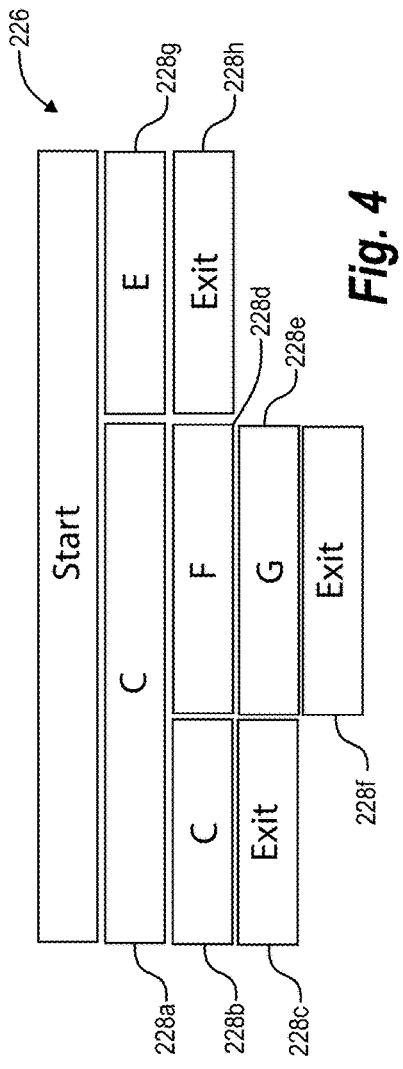
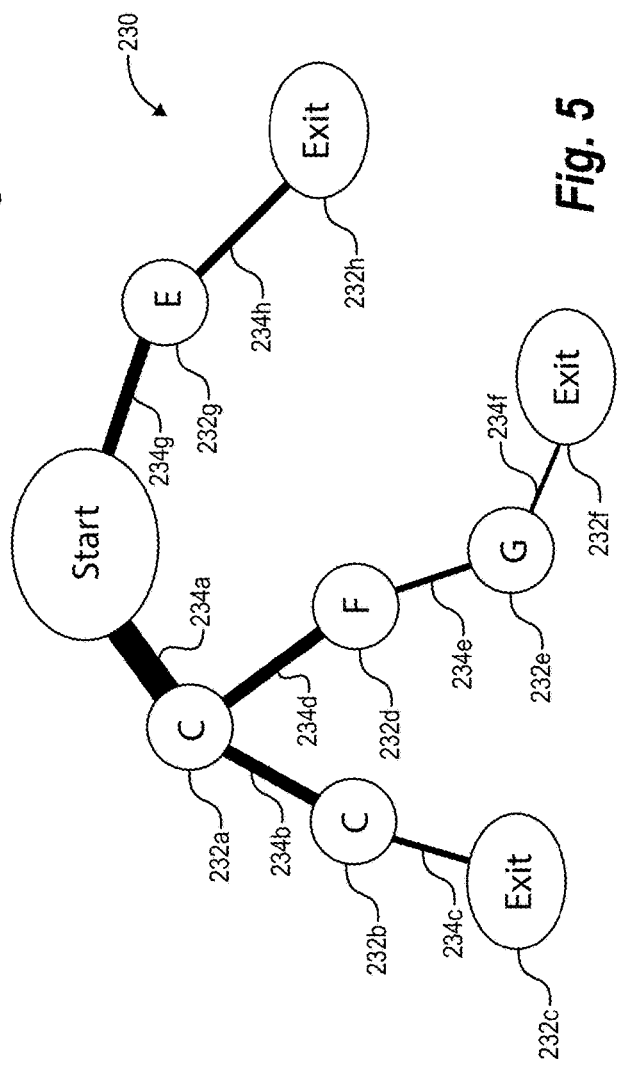

EXTRACTING AND VISUALIZING BRANCHING PATTERNS FROM TEMPORAL EVENT SEQUENCES

BACKGROUND

The use of sequence data is an increasingly important tool in understanding user behaviors with respect to interacting with electronic content (e.g., websites, software applications, etc.). For example, website visitors typically arrive on a website via a variety of different channels, and in addition, once on a website, visitors engage with the website in different ways manifest by different click paths that are captured and stored as sequence data. As such, sequence data can help a website manager accomplish a particular goal by using sequence data to understand how to adjust an advertisement campaign, alter the appearance of a webpage, change the placement of content, and so forth.

In another example, sequence data has the potential to help software developers optimize how users interact with a software application. For instance, sequence data can help a developer understand how users generally interact with an application, how users perform particular tasks within the application, and how often or what types of actions users take within the application. Based on these determinations, the developer can make various changes to the software application to make the application more user friendly, intuitive, and efficient.

Although the potential value provided by understanding sequence data is clear, conventional sequence analysis systems often fail to provide meaningful insight to a developer or manager because of the high-volume nature of sequence data. For example, a sequence dataset for a given period of time may include millions of unique events corresponding to thousands of distinct sequences, where each sequence includes hundreds of different ordered events. Conventional systems often produce statistics regarding the various sequences and/or individual events, but the conventional statistics typically fall short of providing meaningful insight with regard to such large datasets.

In an attempt to overcome providing meaningless statistics related to a given event sequence dataset, many conventional sequence analysis systems attempt to provide visualizations to illustrate insights based on the event sequence data. However, the volume and complexity of event sequence datasets render conventional visualization techniques inadequate for effective analysis. In sum, based on the volume and complexity of event sequence datasets, conventional systems often are not capable of providing a meaningful visualization that provides insight to allow developers and managers to make informed decisions.

Thus, a need exists to extract meaningful analytical data from large and complex event sequence datasets in a quick and efficient manner. Moreover, a need exists for an intuitive way to visualize large and complex event sequence datasets to generate and provide insightful and actionable information to website managers, software application developers, and others.

SUMMARY

One or more embodiments described herein provide benefits and solve the foregoing and other problems in the art with systems and methods that efficiently extract, and intuitively and meaningfully visualize, event sequence data from large event sequence datasets. In one or more examples, the systems and methods efficiently analyze large event sequence datasets to extract a branching pattern by identifying key events (e.g., the most frequent events within an event sequence dataset). In addition, based on identifying key events, the systems and methods further identify event sequence flow paths between the key events. Based on the identified key events and event sequence flow paths, the systems and methods generate a branching pattern organization of event sequence data from an event sequence dataset that meaningfully and intuitively indicates the frequency of particular event sequences based on user event activity (e.g., users' interaction with a website or software application).

Additionally, and based on the branching pattern organization of event sequence data, one or more embodiments of the systems and methods generate interactive visualizations of the branching pattern extracted from an event sequence dataset. For example, one or more embodiments generate an interactive visualization of the branching pattern including nodes that indicate the key events. Furthermore, the systems and methods generate a visualization that includes links between the nodes that provide an intuitive understanding of the different event sequences between key events, as well as the volume of each of the different event sequences. Accordingly, by utilizing the generated interactive visualization based on an extracted branching pattern, a data analyst can quickly and easily gain valuable insight by understanding the key patterns of event sequences within a large and complex event sequence dataset.

Additional features and advantages of the present invention will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

The detailed description is described with reference to the accompanying drawings in which:

FIG. 4 illustrates a schematic diagram of a modified icicle visualization in accordance with one or more embodiments;

FIG. 5 illustrates a schematic diagram of a node-link visualization in accordance with one or more embodiments;

DETAILED DESCRIPTION

Figure 1:
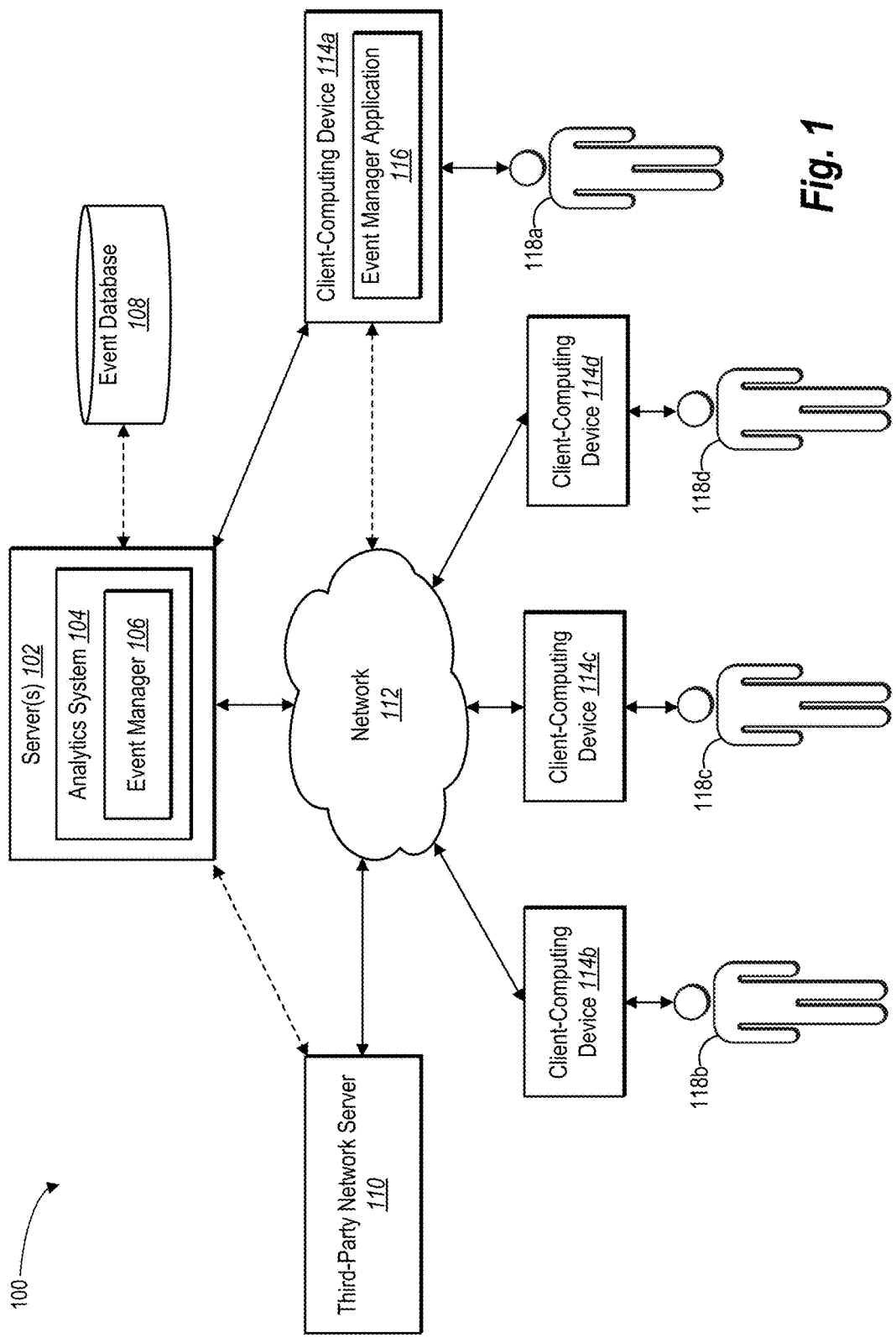
FIG. 1 illustrates a schematic diagram of an environment in which an event system operates in accordance with one or more embodiments.

One or more embodiments described herein include an analytics system (or simply "system") that includes an event manager that efficiently extracts, intuitively organizes, and meaningfully visualizes event sequence data from a large event sequence dataset. In one or more examples, the system analyzes an event sequence dataset to extract a branching pattern that represents significantly frequent event sequences within the event sequence dataset. In particular, the branching pattern is extracted by identifying key events (e.g., the most frequent events), and then determining event sequence flow paths that connect key events. Furthermore, and based on the extracted branching pattern, the system also generates an interactive data visualization that intuitively and meaningfully represents significant event sequences within an event sequence dataset. For example, the system generates an interactive data visualization that clearly visualizes key events within the event sequence dataset, as well as significant event sequence flow paths between the key events.

As a brief overview, and as will be explained in additional detail below, an event sequence dataset includes event data generated in response to users' interactions with electronic content (e.g., a selection of a hyperlink in a webpage or a selection of a command in an application). Event data for a single event instance includes a description of the event (e.g., the selected hyperlink), a timestamp associated with the event (e.g., the time and date of the user interaction), and a user ID or device ID corresponding to the user interaction. Event data received with respect to a particular user (e.g., based on a user ID or device ID), over a specified period of time (e.g., based on the timestamp) are organized into an event sequence, or in other words, an event sequence is an ordered list of actions taken by the single user over a specified period of time. Accordingly, a typical event sequence dataset includes a large number of instances of event data (e.g., hundreds of thousands, millions, or more), having potentially thousands of unique event sequences performed by a large number of users.

To meaningfully organize and generate insightful data visualizations of event sequences, the system analyzes the event sequence dataset to extract a branching pattern that identifies key events and organizes event sequences as flow paths between the key events. In one or more embodiments, the system analyzes the event sequence dataset by applying a rank-divide-trim methodology that iteratively identifies statistically significant events (i.e., key events), and then identifies event sequences that make up an event flow path between the key events. Based on the rank-divide-trim methodology, the system generates a branching pattern organization of the event data where a "fork" or "node" in a branch represents a key event, and each individual branch represents an amount of event sequences that create a flow path between two key events.

In one or more embodiments, the system begins the rank-divide-trim process by ranking the events within an event sequence dataset to identify statistically significant events, or key events, within the event sequence dataset. In some embodiments, the system applies a ranking function to all events within the event sequence dataset that ranks the events in order of frequency (e.g., the higher the frequency of an event, the higher the rank). Accordingly, the system identifies a top-ranked event within the event sequence dataset, labels the top-ranked event as a key event, and adds the key event to the branching pattern (e.g., as a node of one or more branches).

After the ranking process identifies the key event, the system moves to the divide process within the rank-divide-trim methodology to generate a subset of event sequences that include the key event. For instance, the system divides all event sequences within the dataset into one of two groups based on the key event. If an event sequence includes the key event, the system assigns that event sequence to a first group representing sequences that incorporate the key event. On the other hand, if an event sequence does not include the key event, the system assigns that event sequence to a second group representing sequences that do not incorporate the key event. Those event sequences that do not include the key event are eventually analyzed at a later iteration.

Following the divide process, the system applies a trimming process to the event sequences assigned to the first group of sequences that include the key event. In particular, the system performs the trimming process by trimming each event sequence in the first group according to a location of the key event within each specific event sequence. For instance, and for a specific event sequence, the system trims the event sequence from a first event in the event sequence up to, and including, the first occurrence of the key event in the event sequence. In this way, the system removes the first instance of the key event from within each of the first group of sequences to prepare the event sequences in the first group for the next iteration of the rank-divide-trim methodology.

In particular, and with respect to the now-trimmed event sequences in the first group, the system repeats the rank-divide-trim methodology to identify a second key event. For example, the system applies a ranking function to the now-trimmed event sequences to identify a top-ranked event within the now-trimmed event sequences, labels the top-ranked event as a second key event, and adds it to the branching pattern. Next, the system divides the now-trimmed event sequences into two sub-groups, a first sub-group that includes the second key event, and a second sub-group that does not include the second key event. The event sequences that are within the first sub-group that includes the second key event are those sequences that make up the flow path (e.g., branch) between the first key event and the second key event, and accordingly, the system assigns those event sequences to the flow path between the first and second key events.

The system continues to recursively repeat the rank-divide-trim steps until the end of each event sequence is reached or when the number of event sequences containing the next top-ranked event is smaller than a pre-defined number (e.g., a defined minimum support threshold). In other words, the system iteratively identifies key events, and identifies and assigns event sequences to flow paths between identified key events, until all statistically significant event sequences are identified. As such, the system efficiently and accurately identifies and organizes a significant volume of event data into a meaningful branch pattern that provides insightful analytics that a developer can readily understand.

Furthermore, and based on the extracted branching pattern, in one or more embodiments, the system generates an interactive visualization. For example, the system can generate interactive visualizations that provide a display of the extracted branching pattern that is intuitive to understand. In particular, the system generates an interactive visualization where the key events are displayed as nodes within the visualization, and the flow paths are visually displayed as links between the nodes within the visualization.

In addition, the system provides the interactive visualization in a graphical user interface that further allows a user to select a dataset, change parameters, define an analysis funnel in the branching pattern, drill down to more detailed data with respect to a particular node (e.g., key event) or with respect to a particular link (e.g., a flow path including one or more sequences of events between two key events). For instance, a user can select a particular link between two nodes, and in response, the system generates a second visualization that is specific to the event sequences associated with the particular link to allow a developer to further understand user behavior between two particular key events. This "drilling down" visualization technique allows a developer to quickly and efficiently analyze very specific event sequences within a meaningful context that is made possible by the extracted branching pattern.

Accordingly, the system provides numerous advantages over conventional sequence analysis systems that provide meaningless statistics related to a given event sequence dataset. For example, the system efficiently analyzes enormous datasets to provide interactive visualizations that are highly insightful, as well as easily understandable. For instance, the system generates interactive visualizations that intuitively illustrate key events within the event sequence dataset, as well as significant event sequence flow paths between the key events. Thus, the system provides meaningful insight to an analyst seeking to understand the frequent patterns of user interactions (e.g., relative to a web page, a software product, etc.), even when those frequent patterns of interactions are included within large volumes of event sequence data.

Additionally, the system described herein solves the problems described above by providing robust and thorough analysis of large volumes of event sequence data in a quick and efficient manner. For example, the systems and methods described herein can compute branching patterns for millions of events in just a few seconds. As mentioned above, the event system utilizes a rank-divide-trim methodology that analyzes event sequence datasets so efficiently that the event system can provide insightful visualizations in an interactive manner based on receiving user queries and user interactions. This is a vast improvement over conventional sequence analysis systems that require large amounts of time and computing resources in order to output simple event statistics that are difficult understand.

As used herein, an "event" refers to a tracked user interaction in connection with electronic content, such as a web page and/or a software application. Event data for a single event instance includes a description of the event, a timestamp associated with the occurrence of the event, and a user ID and/or device ID that initiated the event. For example, an event in connection with a web page can include a user clicking on a hyperlink within the web page, viewing the webpage for a duration of time, scrolling through content on the webpage, selecting items to put into a shopping cart, and/or making a purchase on the website. Similarly, an event in connection with a software application can include a user executing a software application, selecting a command within the software application (e.g., file commands such as open or save, edit commands, viewing commands, formatting commands, etc.), and/or closing the software application.

As used herein, a "key event" is a statistically significant event across all users within an event sequence dataset. In one or more embodiments, key events are identified by a ranking function that ranks events within an event sequence dataset and identifies a top-ranked event as a key event. Ranking functions can be based on frequency of an event, total number of occurrences of an event, timestamp associated with an event, type of event, and/or other event characteristics. Moreover, in addition to ranking functions, key events can be identified based on other factors, for example, a key event can be user defined.

As used herein, an "event sequence" sequence refers to a listing of events generated by a particular user that occur over a given period of time. In one or more embodiments, the listing of events is a chronologically ordered listing of events. For example, and in the case of a website, an event sequence for a twenty-four-hour period relative to a particular user will include an ordered listing of the user's interactions with the website during the twenty-four-hour time period. As another example, an event sequence includes user interactions that occur within a minimum threshold of time between events (e.g., when each event within an event sequence occurs within three minutes of the last event). Moreover, event sequences can be generated based on event types, e.g., a user can define an event sequence that starts with a first event and ends in a second event. In such a case, the event sequence would include the first event, the second event, and any intervening events.

As used herein, a "branching pattern" refers to a representation of key events and event sequences associated with the key events. In one or more embodiments, a branching pattern includes one or more flow paths that connect key events. As used herein, a "flow path" refers to one or more event sequences within a branching pattern that connects two key events. For example, given a first key event and a second key event, a flow path between the first and second key events one or more intervening event sequences between the first key event and the second key event.

As used herein, an "interactive visualization" refers to a graphical representation of a branching pattern. For example, as will be discussed in greater detail below, the event system generates one or more interactive visualizations of a branching pattern extracted from a dataset. In particular, an interactive visualization of a branching pattern can include nodes that represent key events, and links connecting the nodes that represent event sequences. In one or more embodiments, a user can interact with an interactive visualization to drill down on specific links between key events to gain greater insight into the extracted branching pattern.

FIG. 1 provides an overview of an environment 100 of an analytics system 104 in accordance with one or more embodiments. As illustrated in FIG. 1, the environment 100 may include a server 102, hosting the analytics system 104 that includes an event manager 106, and having access to an event database 108. In addition, the system 104 includes client-computing devices 114a, 114b, 114c, and 114d, associated respectively with users 118a, 118b, 118c, and 118d, a third-party networking server 110 (e.g., a web server), and a network 112 (e.g., the Internet). As further illustrated in FIG. 1, the client-computing devices 114a-114d can communicate with the server 102 and the third-party network server 110 through the network 112.

Although FIG. 1 illustrates a particular arrangement of the server 102, the event database 108, the client-computing devices 114a-114d, the network 112, and the third-party network server 110, various additional arrangements are possible. For example, in one or more embodiments, the event database 108 may be located on the server(s) 102 and/or within the analytics system 104.

While FIG. 1 illustrates four users 118a-118d for explanation purposes, the environment 100 can include any number of users. For example, the analytics system 104 may analyze event sequences associated with a large number of users over a defined period of time. Accordingly, the analytics system 104 analyzes event sequences generated by user interactions provided with respect to any number of client-computing devices. Examples of client-computing devices may include, but are not limited to, mobile devices (e.g., smartphones, tablets), smart wearables, laptops, desktops, or any other type of computing device. See FIG. 12 for additional information regarding client-computing devices.

Additionally, in one or more embodiments, the client-computing devices 114a-114d can communicate with the third-party network server 110 through the network 112. In one or more embodiments, the network 112 may include the Internet or World Wide Web. The network 112, however, can include various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. The network 112 is further described with reference to FIG. 12 below.

In one or more embodiments, the client-computing devices 118a-118d may communicate with the third-party network server 110 for a variety of purposes. For example, the third-party network server 110 may be a web server, a file server, a program server, or another server that provides content with which a user can interact. Thus, in one or more embodiments, the client-computing devices 114a-114d communicate with the third-party network server 110 for purposes such as, but not limited to, requesting a web page, uploading a file, updating a profile, downloading a game, accessing an application, and so forth. For example, in one embodiment, the third-party network server 110 may be a web server for an ecommerce business. In that example, the user 118b may communicate with the web server by requesting web pages from the web server for display via a web browser operating on the client-computing device 114b. In another example, the third-party network server 110 may be a program server that regularly downloads software diagnostic data, including event sequence data, from the client-computing devices 114a-114d.

In one embodiment, the analytics system 104 can track and store various user data based on user-initiated communication between the client-computing devices 114a-114d and the third-party network server 110. For example, the analytics system 104 may track user data including, but not limited to, user actions (i.e., URL requests, link clicks, mouse hovers, text inputs, video views, button clicks, etc.), timestamp data (i.e., when a link was clicked, how long a user stayed on a webpage, when an application was closed, etc.), path tracking data (i.e., what web pages a user visits during a given session, etc.), demographic data (i.e., an indicated age of a user, an indicated gender of a user, an indicated socioeconomic status of a user, etc.), geographic data (i.e., where a user is located, where a web page request came from, etc.), and transaction data (i.e., the types of purchases a user makes, etc.), as well as other types of data.

To illustrate, in one embodiment, the third-party network server 110 may be a web server, and the client-computing device 114b may communicate with the third-party network server 110 to request web page information so that the client-computing device 114b can display a certain web page to the user 118b. In that case, the analytics system 104 may track the user action (i.e., requesting the web page data), the time the action was performed, the geographic information associated with the client-computing device 114b (e.g., a geographic area associated with an IP address assigned to the client-computing device 114b), and/or any demographic data that may be associated with the user 118b.

The analytics system 104 can track and store event sequence data in various ways. For example, in some instances, the third-party network server 110 may track sequence data. In one embodiment, the third-party network server 110 can track sequence data and then provide the event sequence data as an event sequence dataset to the event manager 106. In order to obtain the event sequence data described above, the third-party network server 110 may utilize data stored on the client-computing device 114a-114b (i.e. a browser cookie), embed computer code (i.e., tracking pixels), initialize a session variable, access a user profile, or engage in any other type of tracking technique.

Alternatively or additionally, the analytics system 104 may receive event data directly from the client-computing devices 114a-114d. For example, the third-party network server 110 may install software code on the client-computing devices 114a-114d that causes the client-computing devices 114a-114d to report event data directly to the server 102. Furthermore, in some embodiments, the network 112 may also track event data from the third-party network server 110, the network 112, and/or the client-computing devices 114a-114d.

As further illustrated in FIG. 1, the analytics system 104 may be communicatively coupled with an event database 108 (e.g., a central repository of data). In one or more embodiments, the server 102 may store tracked event sequence data to, and query tracked event sequence data from, the event database 108. In some embodiments, the event database 108 may be separately maintained from the server 102. Alternatively, the server 102 and the event database 108 may be combined into a single device or combination of devices.

In addition, the event database 108 may be a series of remote databases controlled by a central manager. For example, in one or more embodiments, the event database 108 may utilize a distributed architecture, wherein the event database 108 includes multiple storage devices that are not all connected to a common processing unit, but rather are controlled by a database management system. For instance, in one or more embodiments, the multiple storage devices of the event database 108 are dispersed over a network. Stored data may be replicated, fragmented, or partitioned across the multiple storage devices. In at least one embodiment, in response to a data query, the database management system of the event database 108 may return only a random sampling of data to save on processing time and resources. Alternatively or additionally, in response to a data query, the database management system of the event database 108 may return a full dataset.

Furthermore, as shown in FIG. 1, a client-computing device 114a can operate an event manager application 116 that allows a user to access and analyze event data using the analytics system 104 and the event manager 106. In one or more embodiments, a user 118a may be a network administrator who queries sequence data from the analytics system 104 via the client-computing device 114a. In one embodiment, the analytics system 104 may provide various graphical user interface controls and displays to the event manager application 116 at the client-computing device 114a to allow the user 118a to perform event sequence data analysis. Additionally, the analytics system 104 may receive and process requests from the event manager application 116, and provide analysis results based on the received requests. This process is described in greater detail below with reference to FIGS. 2-8.

Figure 2:
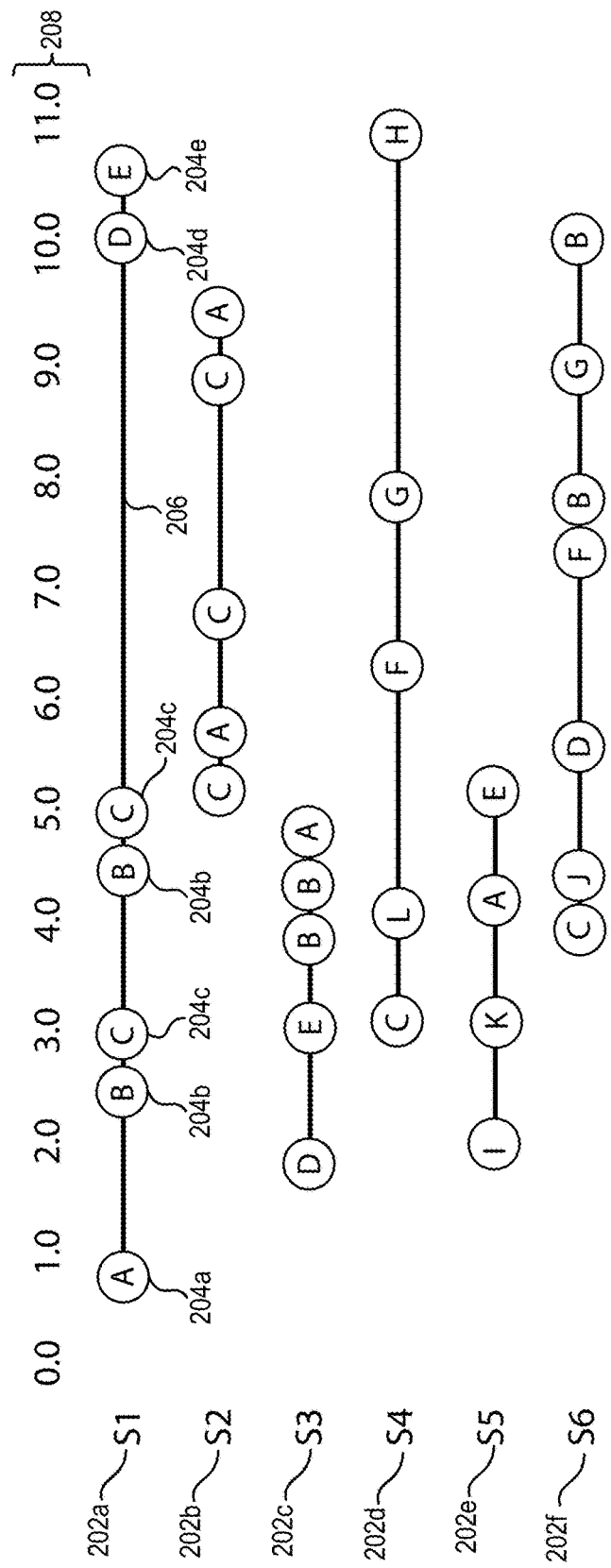
FIG. 2 illustrates a schematic diagram of event sequence data in accordance with one or more embodiments.

FIG. 2 illustrates examples of various event sequences based on event data generated in response to user input or user interaction. As described above, an "event" refers to an action taken by a user in connection with electronic content, such as a web page, a website, a software application, an electronic document, electronic media, or other digital or computer content. For example, an event may include a user's interaction (e.g., a mouse click) with a hyperlink included on a web page. In another example, an event may include a user selecting a command within a software application.

Events are based on event data that is generated in response to a user action, where event data includes information detailing the event. For example, event data includes information detailing the action performed by the user (e.g., a selected link on a website, or a selection of a command in an application), a user identifier associated with the user who performed the action, and a timestamp corresponding to when the action occurred. Event data can include additional information, such as geographic information associated with a user or geolocation of the client-computing device associated with the user, profile or demographic information about the user, client-computing device information, or other information that an electronic content provider may want to include in the event data.

In one or more embodiments, events associated with a single user are accumulated into an "event sequence." As used herein, an "event sequence" is a collection of events performed by a single user over a predetermined amount of time (e.g., an hour, a day, a week, etc.). For instance, using timestamp information associated with events corresponding to a user, the event system can organize events into discrete sequences. For instance, the event system can combine events having timestamps within a defined time period into a sequence. Alternatively, events having timestamps that are within a defined timeframe of another event are combined into sequences (e.g., a sequence of events where each event in the sequence is only separated from the next event in the sequence by a time less than three minutes). Furthermore, and as used herein, an "event sequence dataset" (or simply "dataset") refers to a dataset including multiple sequences of event data for multiple users over a defined period of time.

As a more specific example, FIG. 2 illustrates the event sequence 202a includes events 204a-204e along the sequence axis 206 corresponding to the timestamps 208 (e.g., seconds). In one embodiment, the events 204a-204e along the sequence axis 206 may represent actions taken by a user in connection with a website (e.g., link clicks, mouse hovers, video plays, etc.). In another embodiment, the events 204a-204e along the sequence axis 206 may represent actions taken by a user in connection with a software application (e.g., opening a file, interacting with a project, saving a file, etc.). As shown in FIG. 2, each of the event sequences 202a-202f includes different combinations of events occurring at different times based on the timestamps 208.

As shown in FIG. 2, it is typically difficult to manually identify frequent patterns among the events in each of the event sequences 202a-202f. For example, several frequent patterns exist within the event sequences 202a-202f shown in FIG. 2. For instance, a frequent pattern represented within the event sequences 202a-202f may include a single event (e.g., the single event 204a may be a frequent pattern). Another frequent pattern represented within the event sequences 202a-202f may include multiple events (e.g., a frequent pattern may include the event 204a, followed by the event 204c, followed by the event 204c again).

A simple representation of frequent patterns represented within the event sequences 202a-202f, however, fails to provide any useful analysis of the frequent patterns within in the event sequences 202a-202f. For example, in some embodiments, frequent patterns may outnumber the event sequences from which the frequent patterns were identified, and thus results in a large amount of information for a user to try and view and understand. Furthermore, in some embodiments, frequent patterns may include significant overlap. In other words, the same sequence of events is represented within multiple frequent patterns. In one or more embodiments, this leads to a high degree of visual similarity among the frequent patterns. Overall, a typical representation of frequent patterns identified within event sequences fails to provide an indication of how the frequent patterns relate to each other, and how they fit together to provide an overview of the data. These problems are further compounded when an event sequence dataset is large, as is typical.

To solve for these deficiencies, the analytics system 104 (or simply "system 104") extracts a branching pattern from an event sequence dataset in order to provide visualizations representing an overview of frequent patterns within the dataset. In order to extract a branching pattern from a dataset, the system 104 recursively applies a procedure including three steps: 1) ranking the events within the dataset based on a ranking function and picking a top-ranked event e; 2) dividing event sequences in the dataset into a first group of event sequences that each contain e and a second group of event sequences that do not contain e; and 3) trimming the event sequences in the first group from the first event in the event sequence up to the first occurrence of e. At each recursive iteration, the system 104 adds the top-ranked event to the branching pattern as a node, and assigns the event sequences to the branching pattern as links between nodes, as will be discussed in more detail below.

The system 104 stops the recursive iterations when the system 104 reaches the end of the event sequences or when the number of event sequences containing e is smaller than a pre-defined minimum support. As used herein, the "minimum support" specifies a required minimum number of event sequences containing the top-ranked event e after the division step in the rank-divide-trim process. If the minimum support is not met after the division step, the system 104 ends that iteration of the rank-divide-trim process, and continues the recursion, or if the recursion is complete, the process ends. In at least one embodiment, the event system requires the specification of minimum support as the only parameter (in addition to the dataset) in order to extract a branching pattern. In one or more embodiments, the minimum support may be user defined, or may revert to a default value in the absence of a user definition. In one or more embodiments, the system 104 requires only the minimum support as a parameter along with the event sequence dataset.

Figure 3A:
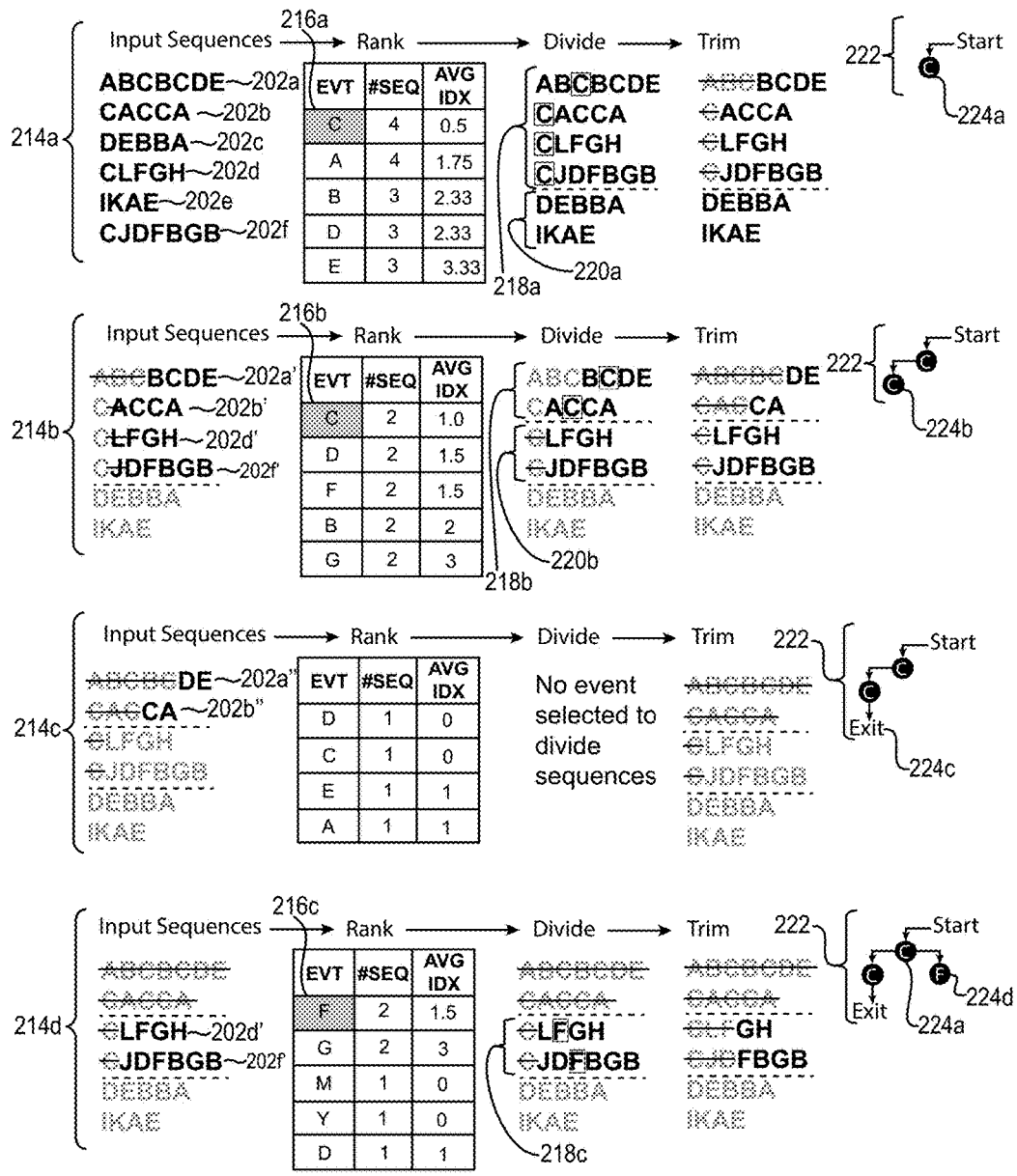
FIGS. 3A and 3B each illustrate a schematic diagram of extracting a branching pattern from an event sequence dataset in accordance with one or more embodiments.
Figure 3B:
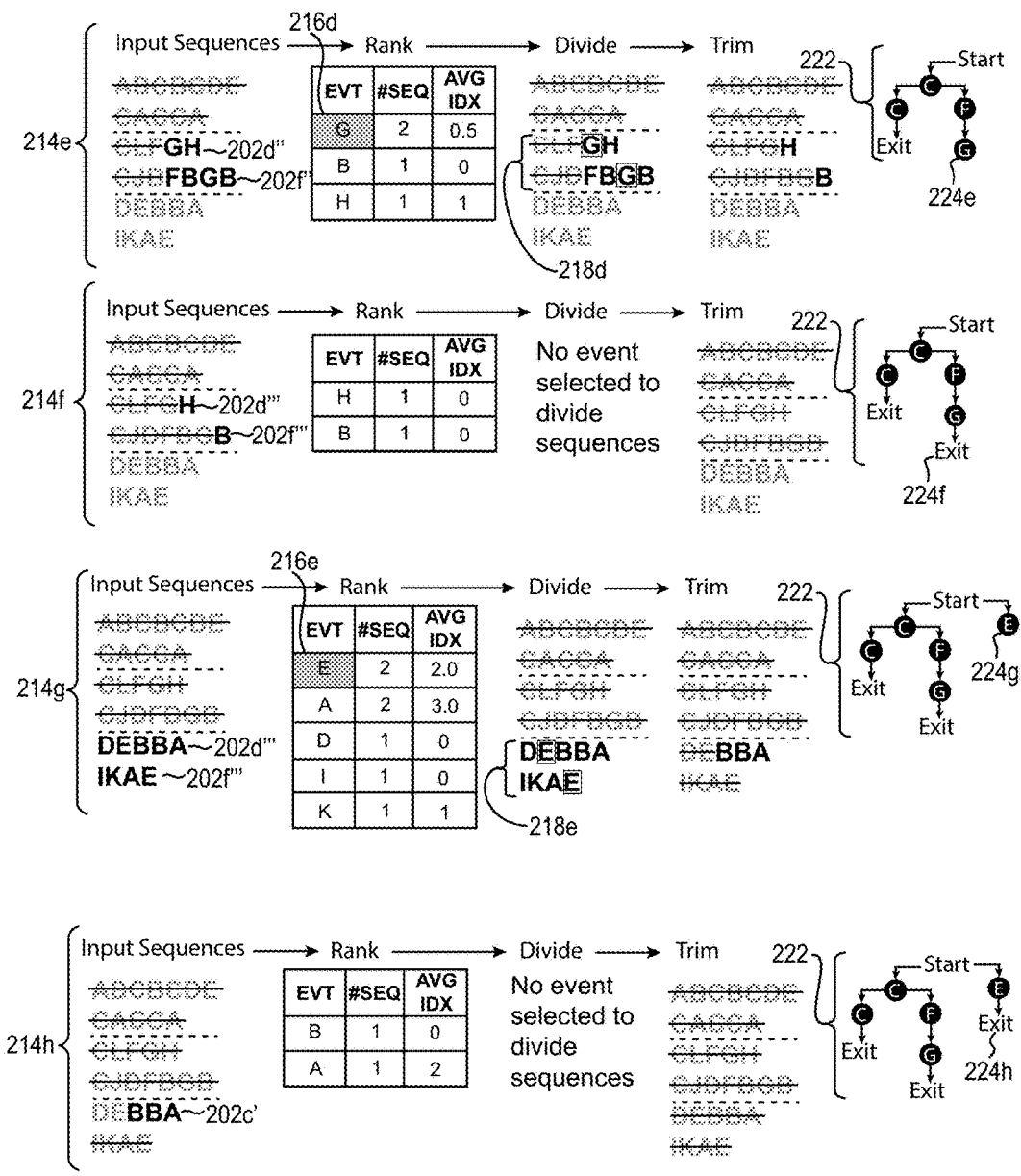

FIGS. 3A and 3B further illustrate the rank-divide-trim procedure utilized by the system 104 to extract a branching pattern from an example dataset having six event sequences. As will be understood based on the disclosure herein, the example dataset illustrated in FIGS. 3A and 3B is for explanation purposes, and the system 104 can perform the same steps, functions, and procedures on a dataset having any number of event sequences (e.g., a typical event sequence dataset will include hundreds, thousands, or more event sequences).

In addition, for the example illustrated in FIGS. 3A and 3B, the system 104 applies the rank-divide-trim procedure using a pre-defined minimum support of 30%. For example, the pre-defined minimum support of 30% specifies that at each iteration of the rank-divide-trim procedure, there must be, after the divide step, at least two event sequences containing the top-ranked event for that iteration. If there are not at least two event sequences containing the top-ranked event after the divide step of a particular iteration (or if there are less than two total event sequences), the system 104 ends that iteration and continues to the next iteration. Furthermore, the rank-divide-trim procedure discussed with respect to FIGS. 3A-3B uses a depth-first approach, but a breath-first approach gives the same result.

As shown in the first iteration 214a, the system 104 accesses the dataset including the six event sequences 202a-202f. The system 104 then ranks the events in the event sequences 202a-202f with a predefined ranking function. The ranking function can include a single ranking algorithm, or alternatively, the ranking function can include a combination of different ranking algorithm that when applied in combination provide an overall rank of events in a given set of event sequences. Example types of ranking algorithms that can be used within a ranking function include, but are not limited to, sequence occurrence frequency algorithms (e.g., the number of sequences that include an event), total occurrence frequency algorithms (e.g., the total number of event occurrences), head of sequence occurrence frequency algorithms (e.g., the number of event sequences that begin with an event), average index algorithms (e.g., the average position of an event within event sequences include the event), median index algorithms (e.g., the median position of an event within event sequences include the event), average or median timestamp algorithms (e.g., ranking earlier occurring events in time based on average timestamp or median timestamp). Accordingly, the ranking function can use one or more of the above or similar-type algorithms to determine a ranking of events, where one or a combination of ranking algorithms gives preference to event characteristics such as frequency of events, repeating of events within a sequence, a position of an event within a sequence, a time of an event, or other event characteristics within a sequence.

In the example illustrated in FIGS. 3A and 3B, the system 104 applies a ranking function that first applies an occurrence frequency algorithm to the event sequences, and then computes an average index algorithm to determine a ranking of events within the six event sequences. For example, for the sequence occurrence frequency algorithm, for any pair of events, the system 104 ranks the event having a higher sequence occurrence frequency (e.g., the number of event sequences in which the event appears) with a higher rank. Note, the sequence occurrence frequency algorithm does not determine a total number of occurrences of an event, but rather determines a number of event sequences that include at least one instance of an event. Accordingly, and as shown in FIG. 3A, the first iteration 214a produces a ranking data table that indicates the number of sequences (i.e., #SEQ) within which each event occurs: C and A each occur in 4 event sequences, and B, D, and E each occur in 3 event sequences.

As mentioned above, the ranking function also applies an average index algorithm to the event sequences to determine the average position of an event within each sequence in which the event occurs. In particular, the average index algorithm ranks events by giving events with average positions near the start of a sequence preference. Thus, as shown in FIG. 3A, the first position (e.g., head position) of a sequence is defined as position "0", and then every subsequence position is incremented a whole value integer (e.g., positions 1, 2, 3, 4, etc.). To illustrate, there are four event sequences that include the event C, and the average index algorithm determines a position for the first occurrence of event C within each event sequence: position "2" for event sequence 202a, and position "0" for event sequences 202b, 202d, and 202f. The average index algorithm then adds the position values and divides by the number of events, so in this case, the average index (AVG IDX) for event C is 2 divided by 4, or 0.5, as illustrated in FIG. 3A. The average index for each of the events is determined using the same process.

Once the sequence frequency (#SEQ) and average index (AVG IDX) is known, the ranking function illustrated in FIG. 3A ranks the events by first prioritizing sequence frequency, and then if two events have the same sequence frequency, the event with the lowest average index is ranked higher. In other words, if two events appear in the same number of event sequences, the system 104 ranks the event with the lower average index with a higher rank. In alternative embodiments, however, the average index ranking algorithm may rank events by prioritizing events with average positions near the middle, the end, or other defined positions within an event sequence.

As shown in the first iteration 214a in FIG. 3A, the system 104 applies the ranking function to the event sequences 202a-202f in order to identify a top-ranked event 216a (i.e., the event "C"). For example, as shown in the first iteration 214a, the system 104 found the top-ranked event 216a in four event sequences with an average index of 0.5. Accordingly, and as shown in the first iteration 214a in FIG. 3A, upon identifying the top-ranked event 216a, the system 104 determines that the top-ranked event 216a is a key event and adds a node 224a associated with the top-ranked event 216a to the branching pattern 222 visualization. As mentioned above, a "key event" refers to a top-ranked event after a ranking function is applied in a specific iteration of the rank-divide-trim procedure. Accordingly, and as will be described in greater detail below, key events are events that are added to a branching pattern visualization as a node. As the recursive rank-divide-trim system progresses through iterations, additional key events will be identified.

After identifying the top-ranked event 216a, the system 104 proceeds to the divide portion of the rank-divide-trim procedure. In particular, the system 104 divides the event sequences 202a-202f into one of two groups based on the top-ranked event 216a. For example, as shown in the first iteration 214a, the system 104 divides the event sequences 202a, 202b, 202d, and 202f into the first group 218a because the event sequences 202a, 202b, 202d, and 202f include the top-ranked event 216a. Similarly, the system 104 divides the event sequences 202c and 202e into the second group 220a because the event sequences 202c and 202e do not include the top-ranked event 216a.

In the trim step of the first iteration 214a of the rank-divide-trim procedure, the system 104 trims the event sequences 202a, 202b, 202d, and 202f in the first group 218a. For example, as shown in FIG. 3A, the system 104 trims the event sequences 202a, 202b, 202d, and 202f from the first event in each event sequence up to and including the first occurrence of the top-ranked event 216a. At this point, the system 104 recursively performs the same steps described with reference to the first iteration 214a using the trimmed event sequences 202a, 202b, 202d, and 202f as the dataset.

For example, as shown in the second iteration 214b in FIG. 3A, the system 104 identifies the top-ranked event in the event sequences 202a', 202b', 202d' and 202f'. As shown in the second iteration 214b, the system 104 identifies the top-ranked event 216b (i.e., the event "C") because the top-ranked event 216b occurs in two of the four event sequences, and also has an earlier average index among the event sequences in which it occurs. For instance, the top-ranked event 216b occurs on average at position "1," while the other occurring events have a higher average position (i.e., AVG IDXs of 1.5, 2, and 3).

Accordingly, the system 104 ranks event 216b as the top-ranked event, assigns event 216b as an additional key event, and adds a node 224b associated with the additional key event to the branching pattern 222 visualization. The key events 216a and 216b are related to one another by a flow path that connects key events (or the link between nodes 224a and 224b shown in the branching pattern 222 visualization). As mentioned above, a "flow path" refers to a sequence of key events within a branching pattern visualization. For example, and as discussed above, the system 104 provides quick and meaningful insights on events (e.g., hyperlink clicks, file opens, web page scrolls, etc.) that occur most frequently among patterns of event data. Accordingly, a flow path (e.g., the sequence of key events in the branching pattern 222 that includes the nodes 224a and 224b, as shown in the second iteration 214b in FIG. 3A) within a branching pattern visualization indicates that the events associated with each node in the flow path frequently occur in the order indicated by the flow path. Thus, as shown in the branching pattern 222 in the second iteration 214b, the system 104 has determined with statistical significance that the events represented by the nodes 224a and 224b have frequently occurred in the dataset, and have occurred in a specific order.

Next, as shown in divide step of the second iteration 214b, the system 104 divides the event sequences 202a', 202b', 202d' and 202f'. As with the first iteration 214a, the system 104 divides the event sequences 202a' and 202b' into a first group 218b because the event sequences 202a' and 202b' contain the top-ranked event 216b. Moreover, the system 104 divides the event sequences 202d' and 202f' into the second group 220b because the event sequences 202d' and 202f' do not contain the top-ranked event 216b.

Then, as further illustrated in the trim step of the second iteration 214b, the system 104 trims the event sequences 202a' and 202b'. For example, as shown in FIG. 3A, the system 104 trims the event sequences 202a' and 202b' from the first event in each event sequence up to and including the first occurrence of the top-ranked event 216b. At this point, the system 104 again recursively performs the same steps described with reference to the first iteration 214a and the second iteration 214b using the trimmed event sequences 202a' and 202b' as the dataset.

For example, as shown in the third iteration 214c the system 104 attempts to identify a top-ranked event in the event sequences 202a" and 202b", but as shown in FIG. 3A, there is no top-ranked event in the event sequences 202a" and 202b". However, as discussed above, the pre-defined minimum support for the example illustrated in FIGS. 3A and 3B is 30%, or at least two event sequences. Since neither event sequence in the third iteration 214c include a top-ranked event, the minimum support is not met and the procedure with respect to the event sequences 202a" and 202b" ends. When the procedure ends, the system 104 adds an "exit" event, or exit node 224c to the branching pattern 222 visualization.

Upon adding an exit node 224c to the branching pattern 222, the event system recursively returns to prior created groups of event sequences that have not yet been fully processed using the rank-divide-trim procedure. For instance, and in the fourth iteration 214d shown in FIG. 3A, the system 104 inputs the second group 220b of event sequences 202d' and 202f' as the input sequences. At this point, the system 104 again repeats the rank-divide-trim procedure described above. For example, the system 104 applies the ranking function to the event sequences 202d' and 202f' to identify a top-ranked event 216c. At this point, the system 104 determines the top-ranked event 216c is a key event and adds the top-ranked event 216c to the branching pattern 222 (e.g., adds node 224d to the branching pattern 222 visualization). Because the system 104 has recursively moved back to a previously identified group (e.g., group 220b), the system 104 adds the top-ranked event 216c as a child to the first key event (represented by adding node 224d as a child to node 224a along a new flow path from the node 224a in the branching pattern 222 visualization).

Next, the system 104 divides the event sequences 202d' and 202f' into the first group 218c because both event sequences 202d' and 202f' contain the top-ranked event 216c. As shown in the fourth iteration 214d, the system 104 cannot create a second group of event sequences because both event sequences 202d' and 202f' contain the top-ranked event 216c. Accordingly, the system 104 moves to the next step and trims the event sequences 202d' and 202f' from the first event in each sequence up to and including the first occurrence of the top-ranked event 216c. The system 104 then recursively performs the same rank-divide-trim steps using the trimmed event sequences 202d' and 202f'.

For example, as shown in the fifth iteration 214e in FIG. 3B, the system 104 identifies a top-ranked event in the event sequence input including the event sequences 202d'' and 202f''. As shown in the fifth iteration 214e, the system 104 identifies a top-ranked event 216d, determines the top-ranked event 216d is a key event, and adds the event 216d to the branching pattern (e.g., represented by adding the node 224e associated with the top-ranked event 216d to the branching pattern 222). Next, on the divide step, the system 104 assigns the event sequences 202d'' and 202f'' to the first group 218d because both event sequences include the top-ranked event 216d. Then, the system 104 trims the event sequences 202d'' and 202f'' from the first event in each event sequence up to and including the first occurrence of the top-ranked event 216d.

At this point, the system 104 again recursively performs the rank-divide-trim steps using the trimmed event sequences 202d'' and 202f'' as the event sequence input. However, as shown in the sixth iteration 214f in FIG. 3B, the system 104 determines that the event sequences 202d''' and 202f''' do not meet the minimum support. In particular, the event sequences 202*d*''' and 202*f*''' do not include a top-ranked event (e.g., there are not at least two event sequences that include the top-ranked event). Thus, the system 104 adds an "exit" event to the branching pattern (e.g., represented by adding the exit node 224*f* to the branching pattern 222), and returns to an earlier identified group that has not been fully processed by the rank-divide-trim procedure in the next iteration.

For instance, as shown in FIG. 3B, the system 104 utilizes the second group 220*a* (identified in the first iteration 214*a*) of event sequences 202*c* and 202*e* in the seventh iteration 214*g*. At this point, the system 104 again repeats the rank-divide-trim steps described above. For example, the system 104 applies the ranking function to the event sequences 202*c* and 202*e* to identify a top-ranked event 216*e*. In response to determining the top-ranked event 216*e*, the system 104 adds event 216*e* as a key event within the branching pattern. In particular, the system 104 adds event 216*e* as an unconnected key event because the event sequences 202*c* and 202*e* did not include event "C," which was the starting node of the previously discussed branch. Accordingly, the system 104 adds an unconnected key event, represented by the addition of node 224*g* corresponding with the top-ranked event 216*e* to the branching pattern 222.

Next, the system 104 adds the event sequences 202*c* and 202*e* to the first group 218*e* because both event sequences include the top-ranked event 216*e*, and trims the event sequences 202*c* and 202*e* from the first event in each event sequence up to and including the first occurrence of the top-ranked event 216*e*.

The system 104 then recursively performs the same rank-divide-trim steps using the trimmed event sequences 202*c* and 202*e*. However, as shown in the eighth iteration 214*h* in FIG. 3B, the system 104 determines that the event sequence 202*c*' does not meet the minimum support. In particular, since the event sequence input only included a single event sequence, the system 104 determines that the minimum support requirement is not met. Thus, the system 104 adds an "exit" event (represented by the addition of exit node 224*h* to the branching pattern 222 visualization). Moreover, because at this point in the rank-divide-trim procedure, there are no additional event sequences that have not been processed by the rank-divide-trim procedure, the system 104 terminates the recursion procedure.

As discussed above with regard to FIGS. 3A and 3B, the system 104 utilizes the rank-divide-trim procedure in order to quickly and efficiently identify a branching pattern of flow paths including key events. The rank-divide-trim procedure enables the system 104 to identify the branching pattern utilizing minimal system resources in order to generate a branching pattern that is organized for easy understanding by an analyst or manager. In one or more embodiments, as will be described in greater detail below, the system 104 can provide the information represented within a branching pattern in various ways to provide further insight with regard to key events.

For example, the system 104 can utilize the resulting branching pattern organization to provide a number of different visualization types of the event sequences within an event sequence dataset (e.g., the branching pattern 222 as shown in FIGS. 3A and 3B). For instance, one visualization provided by the system 104 of the extracted branching pattern is a modified icicle plot wherein each partition stack represents a flow path. For example, as shown in FIG. 4, the system 104 generates the modified icicle plot 226, wherein each partition 228*a*-228*h* corresponds to a node 224*a*-224*h* (key event) in the extracted branching pattern 222 (i.e., the key events of the example in FIGS. 3A and 3B). Further, the partition stacks correspond to the flow paths represented within the extracted branching pattern 222. For example, the flow path including the nodes 224*a* and 224*b* in the branching pattern 222 is represented by the partition stack including the partitions 228*a* and 228*b* in the modified icicle plot 226.

As shown in the example icicle plot 226 of FIG. 4, in one or more embodiments the system 104 sizes each partition 228*a*-228*h* (e.g., a partition width) to correspond to an amount of event sequences that "flow" through the associated flow path within the extracted branching pattern 222. For instance, the larger the width of a particular partition, the higher the amount of event sequences that "flow" through the event. In other words, the system 104 sizes each partition 228*a*-228*h* such that the width of each partition 228*a*-228*h* visually indicates an amount of event sequences that pass through that partition.

For example, as described with reference to FIGS. 3A and 3B, the event sequences 202*a*, 202*b*, 202*d*, and 202*f* follow a flow path that moves from "Start" to the node 224*a* associated with the event 204*c* (e.g., the event "C"), while the event sequences 202*c* and 202*e* follow the flow path that moves from "Start" to the node 224*g* associated with the event 204*e* (e.g., the event "E"). Accordingly, as shown in FIG. 4, the system 104 represents these flow path volumes by sizing the partition 228*a* associated with the event "C" such that the partition 228*a* represents two-thirds of the represented event sequences, while the partition 228*g* represents one-third of the represented event sequences.

Similarly, at the next event level, as described with reference to FIGS. 3A and 3B, the event sequences 202*a* and 202*b* follow the flow path that moves from the node 224*a* (e.g., the event "C") to the node 224*b* (e.g., also the event "C"), while the event sequences 202*d* and 202*f* follow the flow path that moves from the node 224*a* (e.g., the event "C") to the node 224*d* (e.g., the event "F"). Accordingly, in the modified icicle plot 226 in FIG. 4, the system 104 sizes the partitions 228*b* and 228*d* such that each are half the width of the partition 228*a*. Additionally, as the only node that follows the node 224*g* in the extracted branching pattern 222 is the exit node 224*h*, the system 104 sizes the partition 228*h* such that the partition 228*h* is the full width of the partition 228*g* in the modified icicle plot 226 in FIG. 4.

At the next event level described with reference to FIGS. 3A and 3B, the event sequences 202*d* and 202*f* follow the flow path that moves from the node 224*d* (e.g., the event ("F") to the node 224*e* (e.g., the event "G"). Accordingly, in the modified icicle plot 226 in FIG. 4, the system 104 sizes the partition 228*e* such that the partition 228*e* is the full width of the partition 228*d*. Moreover, with regard to the flow path in the modified icicle plot 226 that includes the partitions 228*a* and 228*b*, that flow path ends after the partition 228*b*. Accordingly, the system 104 sizes the exit partition 228*c* such that the exit partition 228*c* is the full width of the partition 228*b*.

At the last event level described with reference to FIGS. 3A and 3B, the flow path that includes the node 224*a* (e.g., the event "C"), the node 224*d* (e.g., the event "F"), and the node 224*e* (e.g., the event "G") include no additional nodes. Accordingly, in the modified icicle plot 226 in FIG. 4, the system 104 adds the exit partition 228*f* and sizes the exit partition 228*f* to the full width of the partition 228*e*. At this point, the system 104 has generated the full modified icicle plot 226 such that each partition 228*a*-228*h* is associated with a node 224*a*-224*h* in the extracted branching pattern 222, and is sized to represent the flow path volume of event sequences that pass through it.

Thus, the resulting modified icicle plot 226 provides flow paths and flow path volumes represented in a branching pattern at a glance. In at least one embodiment, the system 104 further sizes the partitions 228a-228h vertically to indicate a passage of time. For example, if a flow path in the branching pattern 222 indicates that users take additional time moving from one event to another in a flow path, the system 104 can increase the vertical size of the associated partition in the modified icicle plot 226 to indicate this additional time.

Thus, a modified icicle plot generated by the system 104 is an improvement over a traditional vertical icicle plot that displays all information within a dataset. For example, a traditional vertical icicle plot displays each event sequence and every event in every event sequence. Events are represented by rectangular partitions, such that each row of events represents the same level within all the represented event sequences. This traditional vertical icicle plot does not include flow paths of key events (e.g., as in an extracted branching pattern), but instead simply displays a typically overwhelming amount of data including all the events and event sequences represented within a dataset.

In addition to the modified icicle plot 226, the system 104 can generate other types of visualizations that includes flow path volume information based on the extracted branching pattern 222. For example, as shown in FIG. 5, the system 104 can generate a node-link visualization 230. In one or more embodiments, the system 104 generates the node-link visualization 230 to include nodes 232a-232h corresponding to the nodes 224a-224h in the extracted branching pattern 222 illustrated in FIGS. 3A and 3B. Furthermore, in one or more embodiments, the system 104 includes the links 234a-234h connecting the nodes in each represented flow path. As shown in FIG. 5, the system 104 sizes the links 234a-234h to correspond to a volume of event sequences that "flow" through the flow path represented by each link. For example, the highest volume of event sequences represented in the node-link visualization 230 includes the node 232a (e.g., the event "C") as indicated by the thickness of the link 234a.

Figure 6:
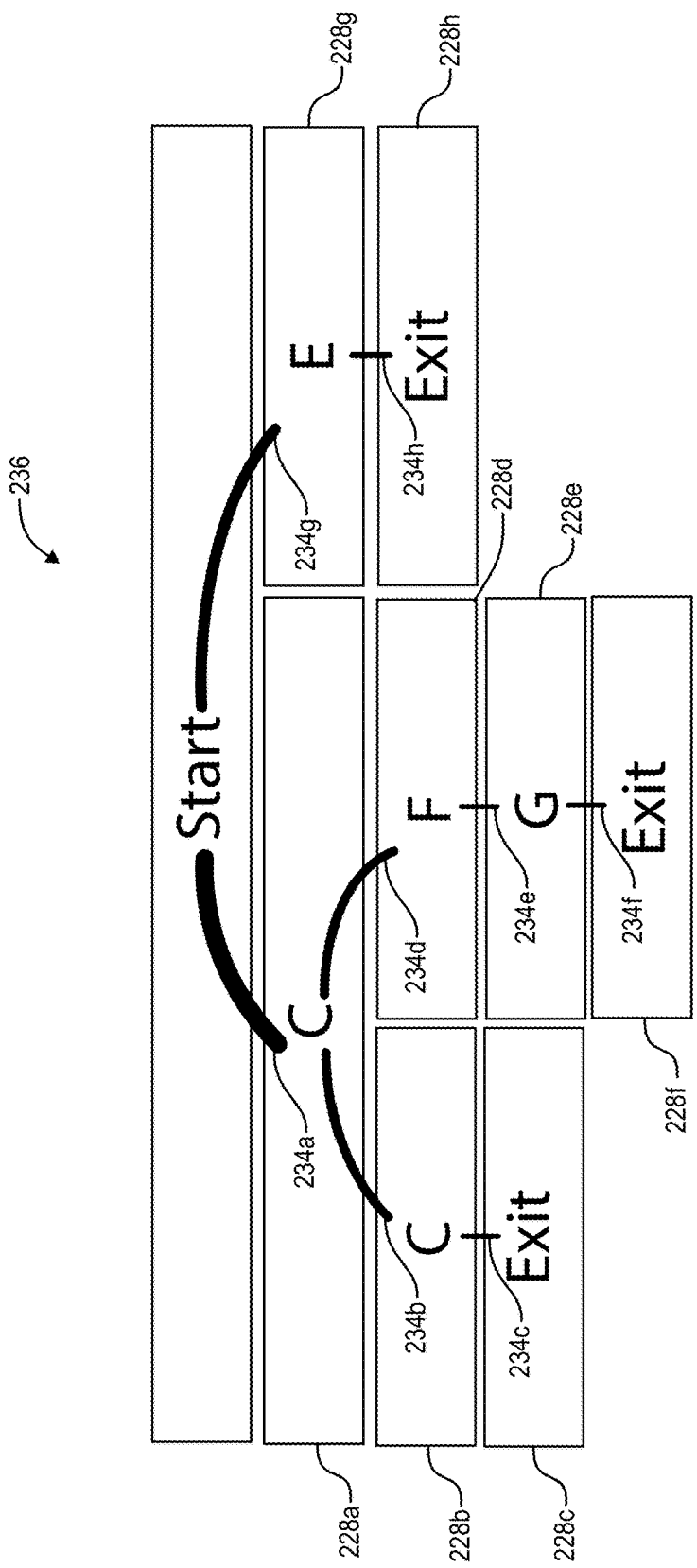
FIG. 6 illustrates a schematic diagram of a hybrid visualization in accordance with one or more embodiments.

In one or more embodiments, the system 104 provides a hybrid visualization, as shown in FIG. 6. For example, as shown in FIG. 6, the hybrid visualization 236 includes the partitions 228a-228h as described with reference to the modified icicle plot 226 in FIG. 4. Additionally, as shown in FIG. 6, the hybrid visualization 236 includes the links 234a-234h as described with reference to the node-link visualization 230 in FIG. 5 overlaid on the partitions 228a-228h. Thus, the hybrid visualization 236 includes elements from both the modified icicle plot 226 and the node-link visualization 230.

Figure 7:
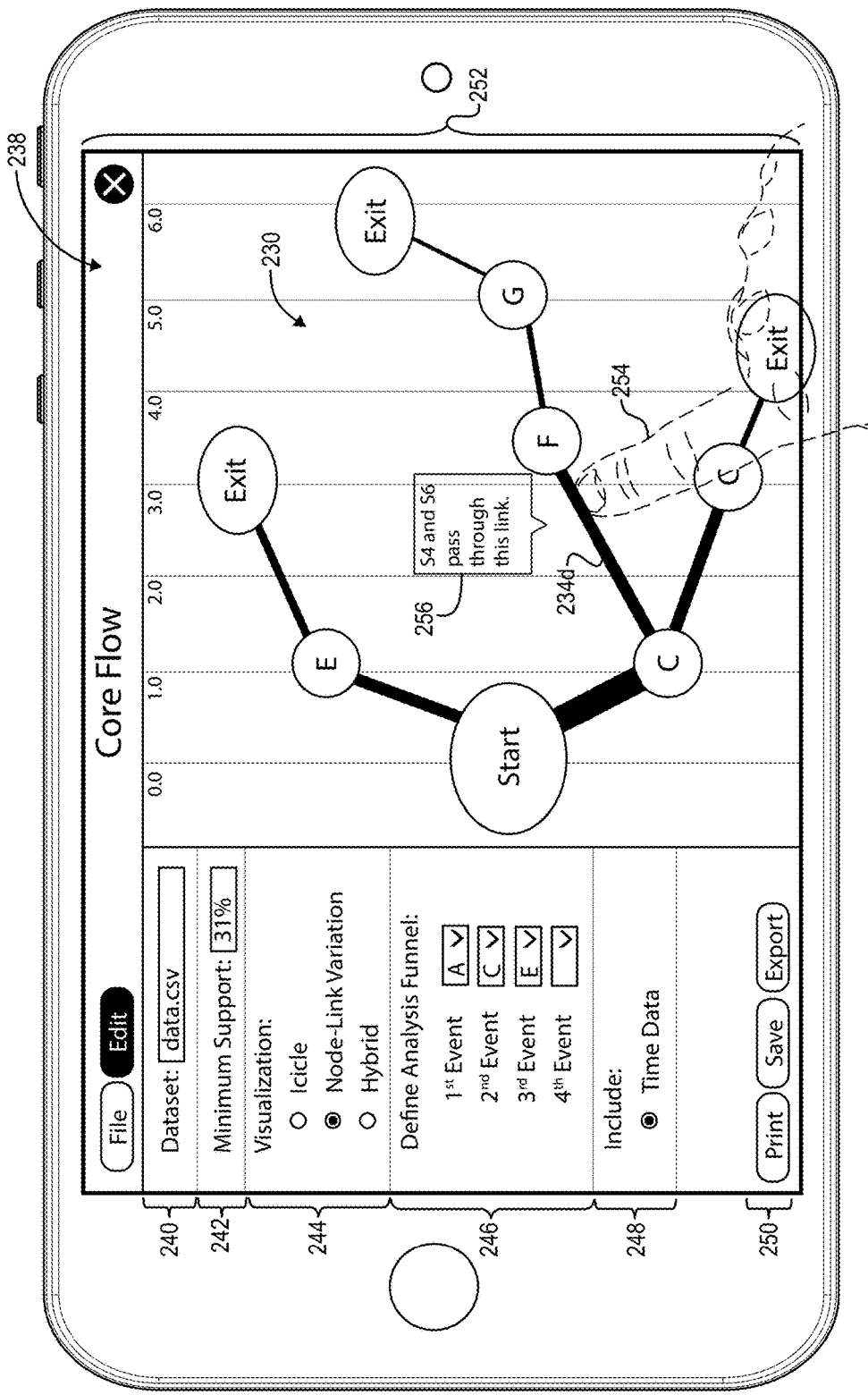
FIG. 7 illustrates an example graphical user interface including an interactive visualization of an extracted branching pattern in accordance with one or more embodiments.

In one or more embodiments, and in order to assist a user in analyzing a dataset, the system 104 can provide any of the visualization types described above in an interactive graphical user interface. For example, as shown in FIG. 7, the system 104 provides a visualization GUI 238. For instance, a user can select an input event sequence dataset via the dataset selection control 240, as well as a minimum support via the minimum support control 242. As discussed above, in at least one embodiment, the event system's 100 only parameter requirements are the input dataset and the minimum support. With these parameters defined via the dataset selection control 240 and the minimum support control 242, the system 104 extracts a branching pattern as described above.

In addition, based on the extracted branching pattern, and utilizing the visualization selection controls 244, the user can select a particular visualization to view in the visualization window 252. As shown in FIG. 7, in response to detecting a selection of the node-link visualization in the visualization selection controls 244, the system 104 provides the node-link visualization 230 in the visualization window 252. Additionally, the system 104 can provide additional information in the selected visualization in response to a selection of one or more of the additional options controls 248. For example, in response to detecting a selection of the time data additional option control 248, the system 104 adds timestamp indicators to the visualization window 252 and rescales the node-link visualization 230 such that the timing of each of the events displayed therein is readily apparent.

As further illustrated in FIG. 7, the system 104 provides additional interactive features in connection with a displayed visualization. For example, in response to detecting a finger 254 tap the link 234d in the node-link visualization 230, the system 104 can provide additional information related to the link 234d in the information window 256 (e.g., a pop-up window, tooltip, or the like). For instance, in response to detecting the finger 254 tap the link 234d, the system 104 provides a list of event sequences that flow through that link in the information window 256. In additional embodiments, the system 104 provides this functionality in response to detecting other types of input (e.g., a touch gesture, a mouse click, a voice command, etc.). Additionally, in response to detecting a user interaction in connection with a node in the node-link visualization 230, the event system can provide additional information related to the node in an information window. For example, the system 104 can provide information such as the title of the node (e.g., the title of the key event associated with the node), a number of times the key event occurred in the selected dataset, and so forth.

In addition to providing interactive visualization of event data, in at least one embodiment, the system 104 also enables a user to drill down to individual links and events of interest. This feature is especially useful when a dataset is large, and the resulting branching pattern visualizations only provide a high-level summary of the dataset. Accordingly, as shown in FIG. 7, the system 104 provides analysis funnel definition controls 246 that enable the user to define an analysis funnel of specific events in which the user is interested. For example, in response to the user defining the funnel of events including "A→C→E," the system 104 can generate a visualization of the defined analysis funnel that includes a volume of event sequences in the dataset that flow through that funnel.

In at least one embodiment, the system 104 provides this information by first dividing the event sequences in the dataset that include event "A" as the top-ranked event. In the next iteration, the system 104 then uses event "C" as the top-ranked event, and then in the next iteration using event "E" as the top-ranked event. In other words, the system 104 essentially forces the top-ranked events in the rank-divide-trim process to be the predefined events in the analysis funnel. In at least one embodiment, when the defined funnel of events is represented in the visualization within the visualization window 252, the system 104 can highlight the nodes and links representing the funnel of events. In one or more embodiments, the system 104 can print, save, export, etc. the settings and visualizations shown in the visualization GUI 238 in response to the user selecting one or more of the controls 250.

Figure 8:
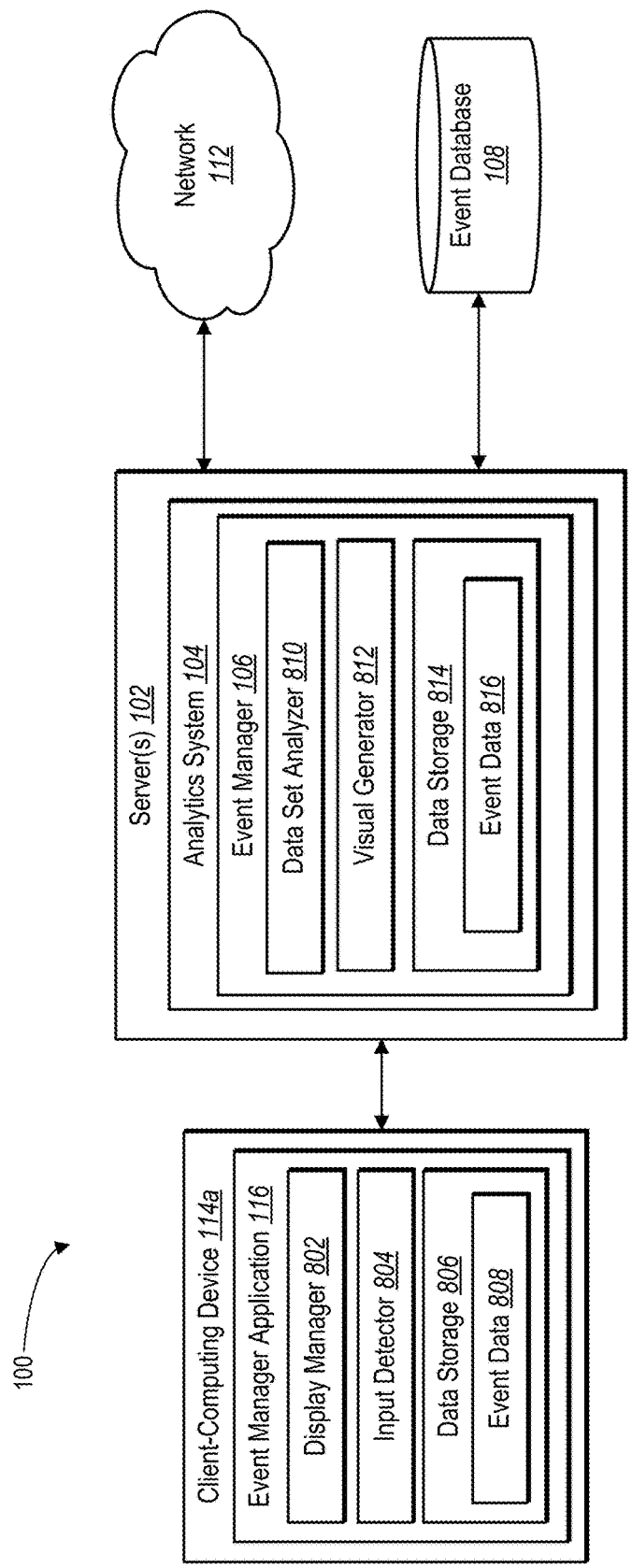
FIG. 8 illustrates an example architecture of the event system in accordance with one or more embodiments.

FIGS. 1-7 and their related descriptions detail the various functions and features of the system 104. FIG. 8 illustrates an example architecture for the system 104. For example, as shown in FIG. 8, the system 104 includes an event manager 106 installed on the analytics system 104 hosted by the server 102, and an event manager application 116 installed on the client-computing device 114a. The event manager 106 includes a dataset analyzer 810, a visualization generator 812, and a data storage 814 including visualization data 816. The event manager application 116 includes a display manager 802, and input detector 804, and a data storage 806 including event data 808. Also shown in FIG. 8, the dataset analyzer 810 may be communicatively coupled with the event database 108.

Although the disclosure herein shows the components 802-816 to be separate in FIG. 8, any of the components 802-816 may be combined into fewer components, such as into a single facility or module, or divided into more components as may serve one or more embodiments. In addition, the components 802-816 may be located on, or implemented by, one or more computing devices, such as those described below in relation to FIG. 11.

In at least one embodiment, the client-computing device 114a is associated with the user 118a who is utilizing the system 104 to analyze a dataset in order to extract a branching pattern. In one or more embodiments, the event manager application 116 is a native application installed on the client-computing device 114a. For instance, the event manager application 116 may be a mobile application that installs and runs on a client device with a touch screen, such as a tablet. Alternatively, the event manager application 116 can run on a non-touch screen enabled device.

Thus, the client-computing device 114a can be any type of computing device (e.g., a desktop or a laptop), but is, in one or more embodiments, a handheld device such as a tablet, a smart phone, smart wearable (e.g., enhanced eyewear), etc. In additional or alternative embodiments, the event manager application 116 is a desktop application, widget, or other form of a native computing program. Alternatively, the search manager 204 can be a remote application accessed by the client-computing device 114a over a network, or may be a web application that is executed with a web browser of a client-computing device 114a and supported by a remote web server.

In one or more embodiments, the components 802-816 comprise software, hardware, or both. For example, the components 802-816 can comprise computing instructions stored on a non-transitory computer-readable storage medium and executable by at least one processor of the client-computing device 114a. When executed by the at least one processor, the computer-executable instructions cause the client-computing device 114a to perform the methods and processed described herein. Alternatively, the components 802-816 can comprise hardware, such as a special purpose processing device to perform a certain function or group of functions. Additionally, the components 802-816 can comprise a combination of computer-executable instructions and hardware.

As mentioned above, and as shown in FIG. 8, the event manager application 116 includes the display manager 802. The display manager 802 provides, manages, or controls a graphical user interface (or simply GUI or user interface) that allows a user to view and interact with visualizations, define analysis funnels, specify datasets, and so forth. For example, the display manager 802 provides a user interface that facilitates interactions with a display. Likewise, the display manager 802 provides a user interface that displays information received from the event manager application 116.

More specifically, the display manager 802 facilitates the display of a user interface (e.g., by way of a display associated with the client-computing device 114a). For example, the display manager 802 composes a user interface of a plurality of graphical components, objects, or elements that allow a user to interact with the system 104. More particularly, the display manager 802 directs the client-computing device 114a to display a group of graphical components, objects, or elements as directed by the event manager application 116, as will be described further below.

As further illustrated in FIG. 8, the event manager application 116 includes an input detector 804. In one or more embodiments, the input detector 804 detects, receives, or facilitates user input in any suitable manner. In some examples, the input detector 804 detects one or more user interactions with respect to the user interface. As referred to herein, a "user interaction" means a single interaction, or combination or interactions, received from a user by way of one or more input devices.

For example, the input detector 804 detects a user interaction from a keyboard, mouse, touch pad, touch screen, a microphone, or any other input device. In the event that the client-computing device 114a includes a touch screen, the input detector 804 can detect one or more touch gestures (e.g., swipe gestures, tap gestures, pinch gestures, or reverse pinch gestures) that form a user interaction. In some examples, a user provides the touch gestures in relation to, or directed at, one or more graphical objects or graphical elements of a user interface. Also in some examples, the client-computing device 114a includes a microphone. In that case, the input detector 804 can use voice translation technology in order to utilize user voice inputs.

The input detector 804 may additionally, or alternatively, receive data representative of a user interaction. For example, the input detector 804 may receive one or more user configurable parameters from a user, one or more user commands from the user, or any other suitable user input. The input detector 804 may receive input data from one or more components of the event manager application 116, from the data storage 806, or from one or more remote locations (e.g., the event manager 106).

The event manager 106 and/or the event manager application 116 can perform one or more functions in response to the input detector 804 detecting user input or receiving other data. Generally, a user can control, navigate, and otherwise interact with the system 104 by providing one or more user inputs that the input detector 804 detects. For example, in response to the input detector 804 detecting user input, one or more components of the event manager application 116 allow the user to view data, interact with various controls, submit commands, etc.

Also as mentioned above, the event manager application 116 includes a data storage 806. The data storage 806 stores and maintains event data 808 representative of event information such as, but not limited to, defined analysis funnels, generated visualizations of extracted branching patterns, and so forth.

Furthermore, as illustrated in FIG. 8, the system 104 includes the server(s) 102 hosting the analytics system 104. In one or more embodiments, the analytics system 104 performs all the functions involved in tracking, analyzing, and visualizing event sequence data. For example, as shown in FIG. 8, the analytics system 104 includes the event manager 106. In one or more embodiments, the event manager 106 extracts a branching pattern from a dataset, generates one or more visualizations of the extracted branching pattern, and enables other various interactions with the one or more visualizations of the extracted branching pattern. In order to perform these operations, as shown in FIG. 8, the event manager 106 includes the dataset analyzer 810 and the visualization generator 812.

In one or more embodiments, the dataset analyzer 810 receives a dataset and extracts a branching pattern from the received dataset. For example, in at least one embodiment, the dataset analyzer 810 receives a dataset as a file upload from the client-computing device 114a. In another embodiment, the dataset analyzer 810 receives a network address from the client-computing device 114a (e.g., a website or FTP endpoint) and downloads the dataset from the provided address. In yet another embodiment, the dataset analyzer 810 receives a file name or title of a dataset stored in the event database 108 from the client-computing device 114a and downloads the associated dataset from the event database 108.

Once the dataset analyzer 810 receives the dataset indicated by the client-computing device 114a, the dataset analyzer 810 extracts a branching pattern from the dataset. For example, as described above with reference to FIGS. 3A and 3B, the dataset analyzer 810 extracts a branching pattern from the dataset utilizing the rank-divide-trim methodology. In at least one embodiment, the dataset analyzer 810 also receives an indication of the minimum support as input from the client-computing device 114a. The rank-divide-trim process can be illustrated by the following pseudo code:

```
Input:
    S: a collection of sequences
    n: a tree node in the branching pattern
    m: minimum support
procedure COREFLOW (S, n, m)
    if size of S ¡ m then
        add exit as a child of n
        return
    else
        e ← top ranked event from S
        S₀ ← sequences from S that do not contain e
        S₁ ← sequences from S that contain e
        if size of S₁ ¿ m then
            add e as a child of n
            for each sequence s in S₁ do
                idx ← index of first occurrence of e in s
                trim s from 0 to idx
            COREFLOW (S₀, n, m)
            COREFLOW (S₁, e, m)
        else
            add exit as a child of n
            return
```

In one or more embodiments, the dataset analyzer 810 determines the top-ranked event in a dataset in various ways. For example, in the embodiment described with reference to FIGS. 3A and 3B, the dataset analyzer 810 identifies the top-ranked event as the event that occurs with the highest frequency in the dataset. In other embodiments, the dataset analyzer 810 can utilize a median index, or a comparison average or median timestamp to identify the top-ranked event. In yet further embodiments, the dataset analyzer 810 can use other frequency-based metrics such as the number of occurrences, and the number of occurrences as the head of an event sequence. For example, "occurrence" ranking functions give preference to repeating events in potentially fewer event sequences, while "head" ranking functions incorporate the position of events within an event sequence into the metric.

As discussed above, in at least one embodiment, the system 104 allows for the incorporation of a user query in the extraction of a branching pattern. For example, the dataset analyzer 810 can accept as a parameter one or more key events in which a user is particularly interested and can extract a branching pattern based on those key events (e.g., the user's defined analysis funnel of key events). As described above, the dataset analyzer 810 utilizes the defined key events in order to extract a branching pattern specific to those events. The rank-divide-trim process including the user defined funnel of specific events can be illustrated by the following pseudo code:

```
Input:
    S: a collection of sequences
    n: a tree node in the branching pattern
    m: minimum support
    F: an ordered funnel of key events defined by the user
procedure COREFLOW (S, n, m, F)
    if F is not empty then
        f ← first element in F
        add f as a child of n
        remove f from F
        S₀ ← sequences from S that do not contain f
        S₁ ← sequences from S that contain f
        for each sequence s in S₁ do
            idx ← index of first occurrence of f in s
            trim s from 0 to idx
        COREFLOW (S₀, n, m, F)
        COREFLOW (S₁, f, m, F)
    if size of S ¡ m then
        add exit as a child of n
        return
    else
        e ← top ranked event from S
        S₀ ← sequences from S that do not contain e
        S₁ ← sequences from S that contain e
        if size of S₁ ¿ m then
            add e as a child of n
            for each sequence s in S₁ do
                idx ← index of first occurrence of e in s
                trim s from 0 to idx
            COREFLOW (S₀, n, m, F)
            COREFLOW (S₁, e, m, F)
        else
            add exit as a child of n
            return
```

Once the dataset analyzer 810 has extracted a branching pattern from the provided dataset, the visualization generator 812 generates one or more visualizations for the extracted branching pattern. As described above, the visualization generator 812 can generate visualizations including a modified icicle plot, a node-link visualization, and a hybrid visualization including the icicle plot overlaid with the node-link visualization. In at least one embodiment, the visualization generator 812 generates the one or more visualizations including additional interactive elements. For example, in one embodiment, the visualization generator 812 generates a node-link visualization with an additional interactive element that enables the display manager 802 of the event manager application 116 to display a pop-up window. Thus, for example, when a user of the client-computing device 114a hovers a mouse or taps on a link in the node-link visualization, the display manager 802 can display a pop-up window including volume data associated with that link.

Furthermore, as shown in FIG. 8, the event manager 106 also includes the data storage 814. The data storage 814 stores and maintains visualization data 816 representative of visualization information such as, but not limited to, generated visualizations associated with extracted branching patterns. In one or more embodiments, the data storage 814 organizes the visualization data 816 according to user accounts.

Figure 9:
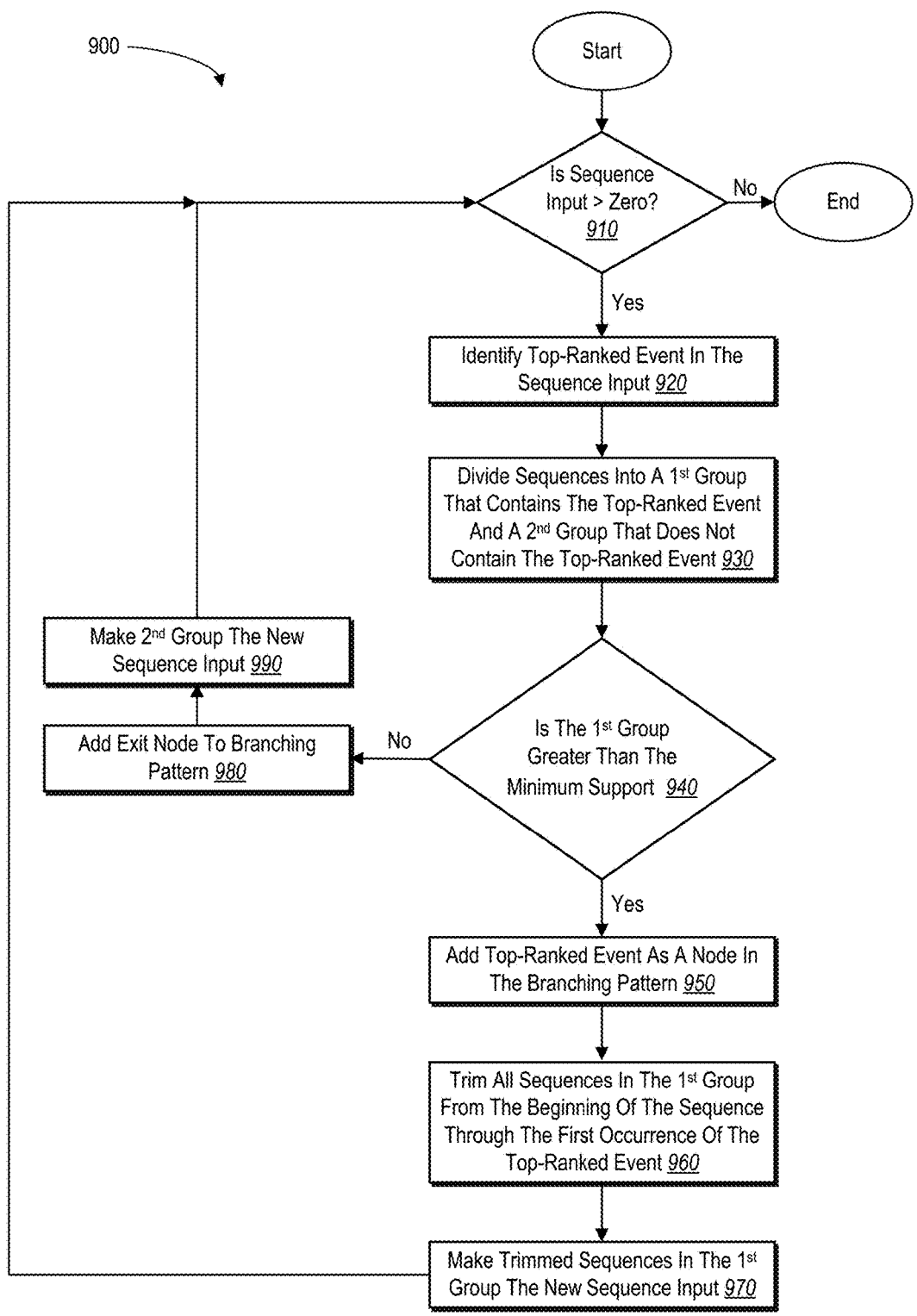
FIG. 9 illustrates an example algorithm for performing a step for extracting a branching pattern from an event sequence dataset in accordance with one or more embodiments.

The rank-divide-trim process is further illustrated in FIG. 9. For example, FIG. 9 illustrates a step 900 for extracting a branching pattern. In one or more embodiments, the step 900 starts with a step 910 of determining whether the number of event sequences in the sequence input is greater than zero. If the number of event sequences in the sequence input is zero, then the rank-divide-trim process is completed and the step 900 ends. If the number of event sequences in the sequence input is greater than the zero, the step 900 includes a step 920 of identifying a top-ranked event in the event sequences in the sequence input.

Next, the step 900 includes step 930 of dividing the event sequences in the dataset into a first group for event sequences that contain the top-ranked event, and into a second group for event sequences that do not contain the top-ranked event. At this point, the step 900 includes a step 940 of determining whether the number of event sequences in the first group is greater than the minimum support. If the response to this determination is "yes," the step 900 includes a step 950 of adding the top-ranked event as a node in the branching pattern. For example, in the first iteration, the branching pattern would only include a single node associated with the top-ranked event. In subsequent iterations, the step 950 includes adding the top-ranked event as a node linked to the most recently added node in the branching pattern. The step 900 then continues with the step 960 of trimming all the event sequences in the first group. For example, the step 960 includes trimming each event sequence from the beginning of the event sequence up to and including the first occurrence of the top-ranked event. At this point, the step 900 includes a step 970 of making the trimmed event sequences in the first group the new sequence input. The step 900 then begins a new iteration by moving back to the step 910 with the new sequence input.

If the number of event sequences containing the top-ranked event is smaller than the minimum support in the step 940, the step 900 includes a step 980 of adding an exit node to the branching pattern. Following this, the step 900 includes a step 990 of making the second group (e.g., the group of event sequences that does not include the top-ranked event in the current iteration) the new sequence input. The step 900 then begins a new iteration by moving back to the step 910 with the new sequence input. In this way, the step 900 progresses recursively through a sequence input in order to extract a branching pattern representing the frequent patterns of events within the sequence input.

Figure 10:
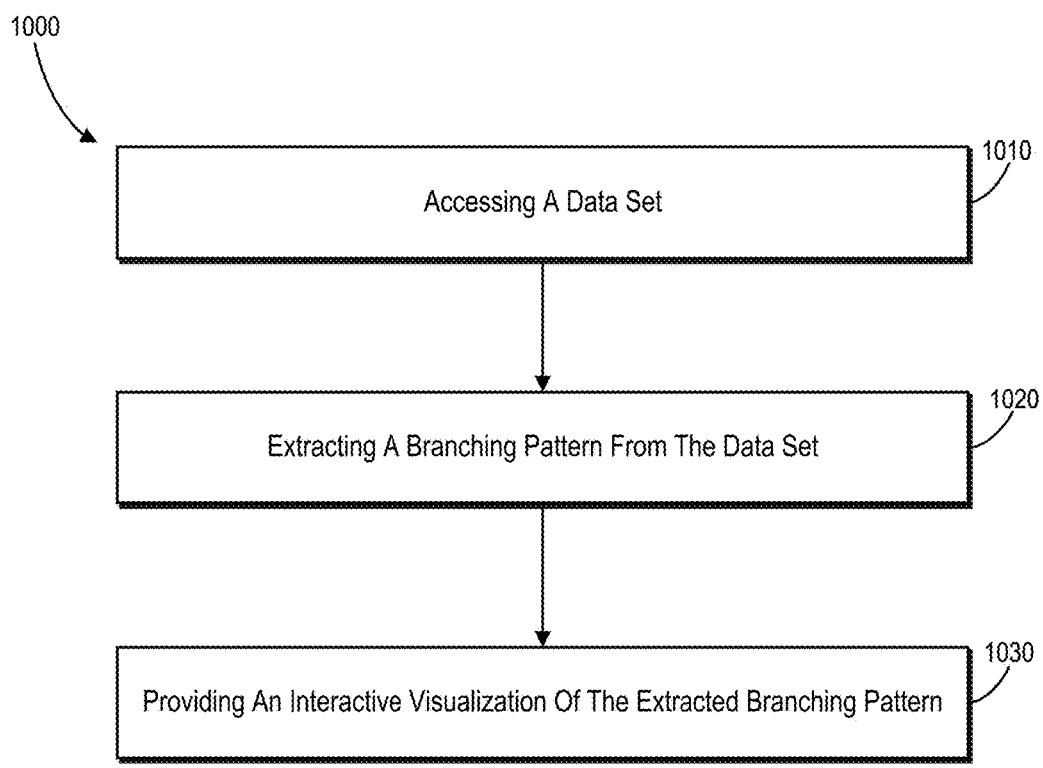
FIG. 10 illustrates a flowchart of a series of acts in a method of providing an interactive visualization of an extracted branching pattern in accordance with one or more embodiments.

FIGS. 1-9, the corresponding text, and the examples provide a number of different methods, systems, and devices for extracting a branching pattern from a dataset. In addition to the foregoing, embodiments can also be described in terms of flowcharts comprising acts and steps in a method for accomplishing a particular result. For example, FIG. 10 illustrates a flowchart of acts and steps in a method of extracting a branching pattern. One will appreciate in light of the disclosure herein that the method may be performed with less or more steps, or that the method may be performed with acts or steps in differing orders. Additionally, the steps or acts described herein may be repeated or performed in parallel with one another or in parallel with different instances of the same or similar steps or acts.

FIG. 10 illustrates a flowchart of one example method 1000 of extracting a branching pattern from a dataset. The method 1000 includes an act 1010 of accessing a dataset. For example, the act 1010 can involve accessing a dataset comprising a plurality of event sequences, each event sequence comprising one or more events.

The method 1000 further includes an act 1020 of extracting a branching pattern from the dataset. For example, the act 1020 can involve extracting a branching pattern from the dataset, wherein the branching pattern comprises one or more flow paths comprising one or more key events from the plurality of event sequences within the dataset. In one or more embodiments, extracting the branching pattern includes: applying a ranking function to the one or more events in each event sequence from the plurality of event sequences; identifying, based on the ranking function, a first top-ranked event; and labeling the first top ranked event as a first key event within the branching pattern.

Additionally, in at least one embodiment, extracting the branching pattern further includes dividing the plurality of sequences into a first group of event sequences that include the first top-ranked event and a second group of event sequences that do not include the first top-ranked event. Further, in at least one embodiment, extracting the branching pattern also includes, for the first group, trimming each event sequence in the first group from a beginning event within the event sequence to a first occurrence of the first top-ranked event within the event sequence to generate one or more trimmed sequences of the first group. In at least one embodiment, extracting the branching pattern further includes applying the ranking function to the one or more trimmed sequences of the first group to identify a second top-ranked event and labeling the second top-ranked event as a second key event within the branching pattern.

Additionally, in at least one embodiment, extracting the branching pattern further includes, for the second group of event sequences that do not include the first top-ranked event, applying a ranking function to each event sequence in the second group and identifying, based on the ranking function, a third top-ranked event. Also, in at least one embodiment, extracting the branching pattern includes labeling the third top-ranked event as a third key event within the branching pattern and, for the second group, trimming each event sequence in the second group from a beginning event within the event sequence to a first occurrence of the third top-ranked event within the event sequence to generate one or more trimmed sequences of the second group.

In one or more embodiments, applying the ranking function to the one or more events in each sequence in the dataset includes applying one of: a sequence occurrence frequency algorithm, a head of sequence occurrence frequency algorithm, an average index function, a median index function, an average timestamp function, or a median timestamp function. Furthermore, in at least one embodiment, trimming each event sequence in the first group is in response to determining that a minimum support is met, and trimming each event sequence in the second group is in response to determining that the minimum support is met. For example, in at least one embodiment, the method 1000 further includes acts of determining a number of event sequences in the first group that include the first top-ranked event, and determining a number of event sequences in the second group that include the third top-ranked event. In that case, the minimum support is met for the first group when the number of event sequences in the first group that include the first top-ranked event is greater than the minimum support, and the minimum support is met for the second group when the number of event sequences in the second group that include the third top-ranked event is greater than the minimum support.

The method 1000 also includes an act 1030 of providing an interactive visualization of the extracted branching pattern. For example, the act 1030 can involve providing an interactive visualization of the extracted branching pattern, the interactive visualization comprising display elements corresponding to the one or more key events across the one or more flow paths. In one or more embodiments, providing the interactive visualization of the extracted branching pattern includes providing one of an interactive icicle plot, an interactive node-link visualization, or an interactive hybrid of both the icicle plot and the node-link visualization.

In at least one embodiment, the method 1000 further includes acts of receiving a user interaction with respect to the interactive visualization, and providing, in response to the received user interaction, additional information about a key event or flow path within a branching pattern set. For example, in at least one embodiment, the interactive icicle plot includes a plurality of display elements, each of the plurality of display elements associated with a key event, and wherein each of the plurality of display elements is sized to indicate a volume of the flow path across the associated key event. Additionally, in at least one embodiment, the interactive node-link visualization includes a plurality of nodes, each node corresponding to a key event and connected by links corresponding to the one or more flow paths. In that case, the links within the one or more flow paths each comprise a width that indicates a volume of event sequences that pass through that link within the flow path. Furthermore, in at least one embodiment, the interactive hybrid of both the icicle plot and the node-link visualization comprises the node-link visualization overlaid on the icicle plot.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
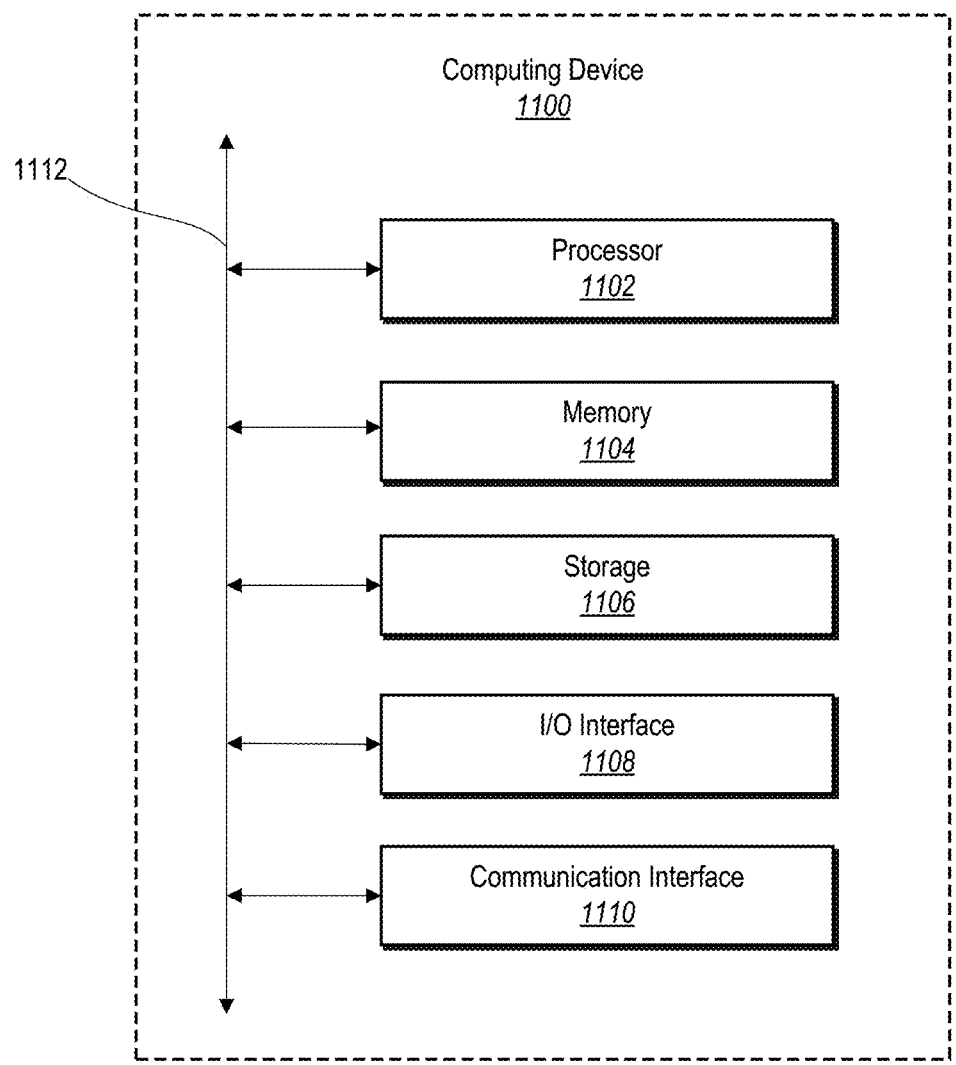
FIG. 11 illustrates a block diagram of an exemplary computing device in accordance with one or more embodiments.

FIG. 11 illustrates, in block diagram form, an exemplary computing device 1100 that may be configured to perform one or more of the processes described above. One will appreciate that the system 104 can be implanted on implementations of the computing device 1100. As shown by FIG. 11, the computing device can comprise a processor 1102, memory 1104, a storage device 1106, an I/O interface 1108, and a communication interface 1110. In certain embodiments, the computing device 1100 can include fewer or more components than those shown in FIG. 11. Components of computing device 1100 shown in FIG. 11 will now be described in additional detail.

In particular embodiments, processor(s) 1102 includes hardware for executing instructions, such as those making up a computer program. As an example and not by way of limitation, to execute instructions, processor(s) 1102 may retrieve (or fetch) the instructions from an internal register, an internal cache, memory 1104, or a storage device 1106 and decode and execute them.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1104 may be internal or distributed memory. In one or more embodiments, the memory 1104 stores or comprises the data storage.

The computing device 1100 includes a storage device 1106 includes storage for storing data or instructions. As an example and not by way of limitation, storage device 1106 can comprise a non-transitory storage medium described above. The storage device 1106 may include a hard disk drive (HDD), flash memory, a Universal Serial Bus (USB) drive or a combination of these or other storage devices. In one or more embodiments, the storage device 1106 stores or comprise the data storage.

The computing device 1100 also includes one or more input or output ("I/O") devices/interfaces 1108, which are provided to allow a user to provide input to (such as user strokes), receive output from, and otherwise transfer data to and from the computing device 1100. These I/O devices/interfaces 1108 may include a mouse, keypad or a keyboard, a touch screen, camera, optical scanner, network interface, modem, other known I/O devices or a combination of such I/O devices/interfaces 1108. The touch screen may be activated with a stylus or a finger.

The I/O devices/interfaces 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1108 is configured to provide graphical data to a display for presentation to a user. The graphical data may be representative of one or more graphical user interfaces and/or any other graphical content as may serve a particular implementation.

The computing device 1100 can further include a communication interface 1110. The communication interface 1110 can include hardware, software, or both. The communication interface 1110 can provide one or more interfaces for communication (such as, for example, packet-based communication) between the computing device and one or more other computing devices 1100 or one or more networks. As an example and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI. The computing device 1100 can further include a bus 1112. The bus 1112 can comprise hardware, software, or both that couples components of computing device 1100 to each other.

Figure 12:
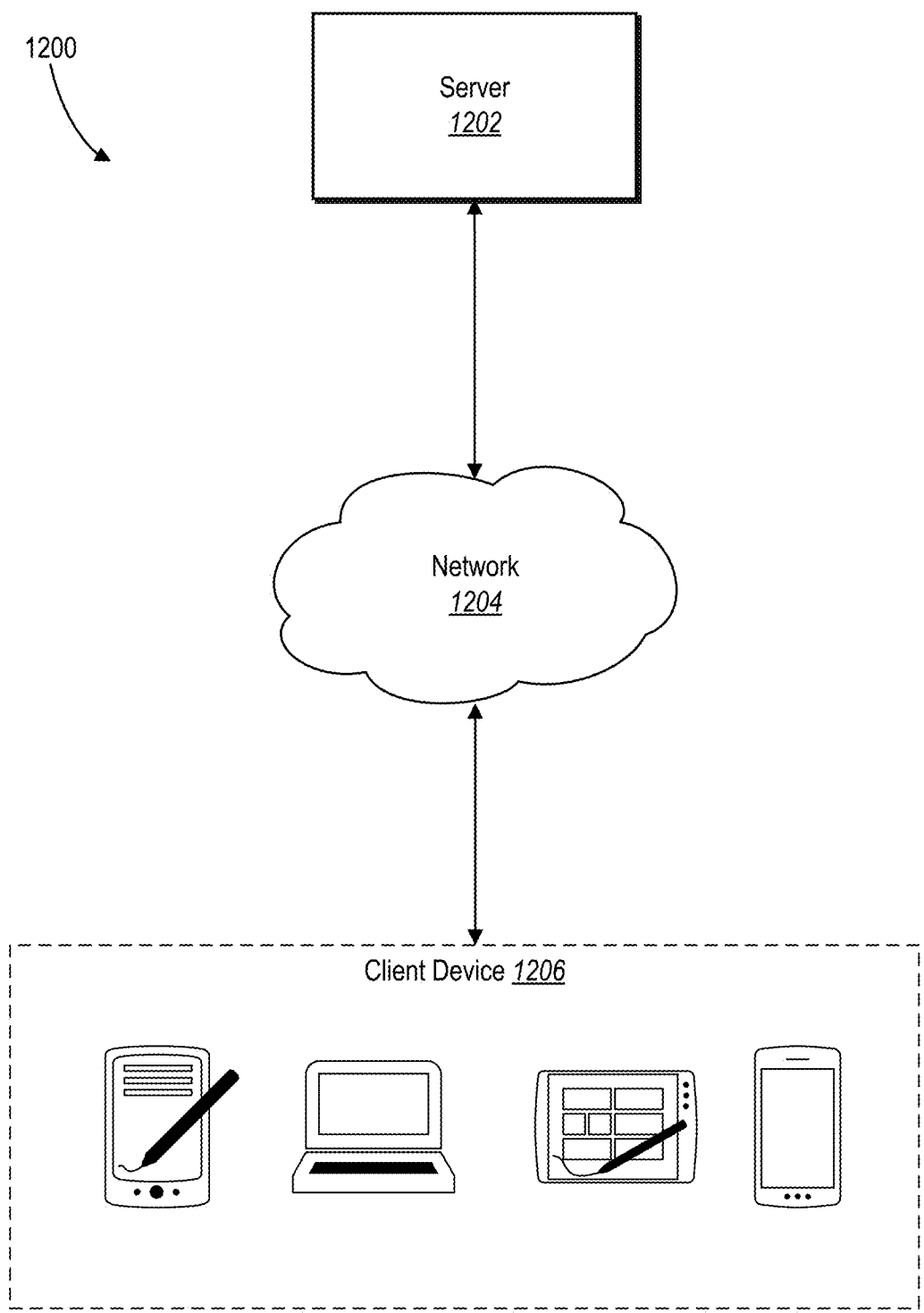
FIG. 12 is an example network environment in which the event system can operate in accordance with one or more embodiments.

FIG. 12 illustrates an example network environment 1200 of in which the system 104 can operate. The network environment 1200 includes a client device 1206, and a server 1202 connected to each other by a network 1204. Although FIG. 12 illustrates a particular arrangement of the client device 1206, the server 1202, and the network 1204, this disclosure contemplates any suitable arrangement of the client device 1206, the server 1202, and the network 1204. As an example and not by way of limitation, the client device 1206 and the server 1202 may be connected to each other directly, bypassing network 1204. As another example, the client device 1206 and the server 1202 may be physically or logically co-located with each other in whole or in part. Moreover, although FIG. 12 illustrates a particular number of client devices 1206, servers 1202, and networks 1204, this disclosure contemplates any suitable number of client devices 1206, servers 1202, and networks 1204. As an example, and not by way of limitation, network environment 1200 may include multiple client device 1206, servers 1202, and networks 1204.

This disclosure contemplates any suitable network 1204. As an example and not by way of limitation, one or more portions of network 1204 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1204 may include one or more networks 1204.

Links may connect client device 1206 and the server 1202 to the communication network 1204 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1200. One or more first links may differ in one or more respects from one or more second links.

In particular embodiments, client device 1206 may be an electronic device including hardware, software, or embedded logic components or a combination of two or more such components and capable of carrying out the appropriate functionalities implemented or supported by client device 1206. As an example and not by way of limitation, a client device 1206 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client devices 1206. A client device 1206 may enable a network user at client device 1206 to access network 1204. A client device 1206 may enable its user to communicate with other users at other client devices 1206.

In particular embodiments, client device 1206 may include a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client device 1206 may enter a Uniform Resource Locator (URL) or other address directing the web browser to a particular server (such as server), and the web browser may generate a Hyper Text Transfer Protocol (HTTP) request and communicate the HTTP request to server. The server may accept the HTTP request and communicate to client device 1206 one or more Hyper Text Markup Language (HTML) files responsive to the HTTP request. Client device 1206 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, server 1202 may be capable of linking a variety of entities. As an example and not by way of limitation, server 1202 may enable users to interact with each other as well as receive content from third-party systems or other entities, or to allow users to interact with these entities through an application programming interfaces (API) or other communication channels.

In particular embodiments, a third-party system may include one or more types of servers, one or more data stores, one or more interfaces, including but not limited to APIs, one or more web services, one or more content sources, one or more networks, or any other suitable components, e.g., that servers may communicate with. A third-party system may be operated by a different entity from an entity operating the server 1202. In particular embodiments, however, the server 1202 and third-party systems may operate in conjunction with each other to provide analytics services to users of the server 1202 or third-party systems. In this sense, server 1202 may provide a platform, or backbone, which other systems, such as third-party systems, may use to provide analytic or data or tracking services and functionality to users across the Internet.

In particular embodiments, a third-party system may include a third-party content object provider. A third-party content object provider may include one or more sources of content objects, which may be communicated to a client device 1206. As an example and not by way of limitation, content objects may include information regarding things or activities of interest to the user, such as, for example, digital media, digital designs, digital photographs, digital videos, digital audio, clip art, fonts, etc. As another example and not by way of limitation, content objects may include metadata that describes the content objects.

In particular embodiments, server 1202 may include a variety of servers, sub-systems, programs, modules, logs, and data stores. In particular embodiments, server 1202 may include one or more of the following: a web server, action logger, API-request server, relevance-and-ranking engine, content-object classifier, notification controller, action log, third-party-content-object-exposure log, inference module, authorization or privacy server, search module, advertisement-targeting module, user-interface module, user-profile store, connection store, third-party content store, or location store. Server 1202 may also include suitable components such as network interfaces, security mechanisms, load balancers, failover servers, management-and-network-operations consoles, other suitable components, or any suitable combination thereof.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps or acts or the steps or acts may be performed in differing orders. Additionally, the steps or acts described herein may be repeated or performed in parallel with one another or in parallel with different instances of the same or similar steps or acts. The scope of the present application is, therefore, indicated by the appended claims rather than by the foregoing description. All changes that come within the meaning and range of equivalency of the claims are to be embraced within their scope.

What is claimed is:

1. In a digital environment for analyzing event sequence data, a method of identifying branching patterns within the event sequence data comprising:

accessing a dataset comprising a plurality of event sequences associated with a plurality of users, each of the plurality of event sequences comprising one or more events, wherein each of the one or more events comprises a single user interaction in connection with electronic content;

analyzing a plurality of event metrics with respect to the one or more events of the plurality of event sequences to identify a first key event;

extracting a branching pattern from the dataset, wherein the branching pattern comprises one or more flow paths comprising the first key event identified from the one or more events of the plurality of event sequences within the dataset; and providing an interactive visualization of the extracted branching pattern, the interactive visualization comprising display elements corresponding to one or more key events connecting the one or more flow paths, the one or more key events comprising the first key event.

2. The method as recited in claim 1, wherein analyzing the plurality of event metrics with respect to the one or more events to identify the first key event comprises:
applying a ranking function that utilizes the plurality of event metrics to each event of the one or more events of the plurality of event sequences;
identifying, based on the ranking function, a top-ranked event from the one or more events; and
labeling the top-ranked event as the first key event.

3. The method as recited in claim 2, wherein extracting the branching pattern further comprises:
dividing the plurality of event sequences by:
assigning event sequences from the plurality of event sequences that comprise at least on instance of the first key event to a first group event sequences; and
assigning one or more event sequences from the plurality of event sequences not assigned to the first group of event sequences to a second group of event sequences.

4. The method as recited in claim 3, wherein extracting the branching pattern further comprises trimming each of the event sequences in the first group of event sequences by removing events in each of the event sequences from a beginning event to the first instance of the first key event to generate trimmed event sequences of the first group of event sequences.

5. The method as recited in claim 4, further comprising analyzing the plurality of event metrics with respect to one or more events of the trimmed event sequences of the first group of event sequences to identify a second key event.

6. The method as recited in claim 4, wherein:
trimming each of the event sequences in the first group of event sequences is based on a minimum support threshold being satisfied; and
the minimum support threshold comprises a minimum number of event sequences in the first group of event sequences that contain the top-ranked event.

7. The method as recited in claim 1, wherein analyzing the plurality of event metrics comprises utilizing two or more of:
an event sequence occurrence frequency algorithm;
a head of sequence occurrence frequency algorithm;
an average index function;
a median index function,
an average timestamp function; or
a median timestamp function.

8. The method as recited in claim 1, wherein providing the interactive visualization of the extracted branching pattern comprises providing one of an interactive icicle plot, an interactive node-link visualization, or an interactive hybrid of both the icicle plot and the node-link visualization.

9. The method as recited in claim 8, further comprising:
receiving a user interaction with respect a first display element corresponding to the first key event of the display elements corresponding to one or more key events of the interactive visualization; and
providing, in response to the received user interaction of the first display element, additional information about the first key event or a flow path corresponding to the first key event within a branching pattern.

10. The method as recited in claim 8, wherein the interactive icicle plot comprises the display elements corresponding to one or more key events, each of the display elements displaying a key event of the one or more key events, and wherein a width of each of the display elements is sized to indicate a volume of the flow path across an associated key event.

11. The method as recited in claim 8, wherein:
the interactive node-link visualization comprises a tree-like structure of nodes, each node displaying a key event and connected by links corresponding to the one or more flow paths;
the links within the one or more flow paths each comprise a width that indicates a volume of event sequences that pass through that link within the flow path; and
the interactive hybrid of both the icicle plot and the node-link visualization comprises the node-link visualization overlaid on the icicle plot.

12. The method as recited in claim 1, wherein the first key event comprises a statistically significant event across the plurality of users within the dataset comprising the plurality of event sequences.

13. The method as recited in claim 8, wherein the first key event is a single event from an event sequence comprising a plurality of individual events, and wherein the first key event is a single user interaction in connection with electronic content.

14. A system comprising:
a non-transitory memory comprising:
a dataset comprising a plurality of event sequences associated with a plurality of users, each of the plurality of event sequences comprises one or more events, wherein each event of the one or more events comprises a single user interaction in connection with electronic content; and
computer readable instructions that, when executed by one or more computer processors, cause the system to:
utilize a rank-divide-trim procedure to identify a first key event based on a plurality of event metrics with respect to the one or more events of the plurality of event sequences;
extract a branching pattern from the dataset based on one or more key events to generate one or more flow paths with respect to the one or more key events, the one or more key events comprising the first key event; and
provide an interactive visualization of the extracted branching pattern, the interactive visualization comprising nodes corresponding to the one or more key events connected by the one or more generated flow paths.

15. The system as recited in claim 14, wherein the rank-divide-trim procedure further comprises:
applying a ranking function utilizing the plurality of event metrics to each event of the one or more events of the plurality of event sequences;
identifying, based on the ranking function, a top-ranked event from the one or more events; and
labeling the top-ranked event as the first key event.

16. The system as recited in claim 15, wherein the rank-divide-trim procedure further comprises:
dividing the plurality of sequences by:

assigning event sequences from the plurality of event sequences that comprise at least one instance of the first key event to a first group event sequences; and assigning one or more event sequences from the plurality of event sequences not assigned to the first group of event sequences to a second group of event sequences.

17. The system as recited in claim 16, wherein the rank-divide-trim procedure further comprises trimming each of the event sequences in the first group of event sequences by removing events in each of the event sequences from a beginning event to the first instance of the first key event to generate trimmed event sequences of the first group of event sequences.

18. In a digital environment for analyzing event sequence data, a method of identifying branching patterns within the event sequence data comprising:

accessing a dataset comprising a plurality of event sequences associated with a plurality of users, each of the plurality of event sequences comprising one or more events, wherein each of the one or more events comprises a single user interaction in connection with electronic content;

performing a step for extracting a branching pattern from the dataset, wherein the branching pattern comprises one or more flow paths across one or more key events within the plurality of event sequences within the dataset; and generating an interactive visualization of the extracted branching pattern, the interactive visualization comprising selectable nodes corresponding to the one or more key events connected by links to form the one or more flow paths.

19. The method as recited in claim 18, further comprising:

detecting a selection of a node of the selectable nodes in the interactive visualization; and providing, in response to detecting the selection, additional information associated with the selected node, wherein the additional information associated with the selected node comprises a title of the key event associated with the selected node.

20. The method as recited in claim 19, further comprising:

detecting a selection of a link corresponding to a flow path in the interactive visualization; and providing, in response to detecting the selection, additional information associated with the selected link, wherein the additional information associated with the selected link comprises a subset of the plurality of event sequences that flow through the selected link.

* * * * *